(12) United States Patent
Shah et al.

(10) Patent No.: US 11,461,295 B2
(45) Date of Patent: Oct. 4, 2022

(54) DATA MIGRATION SYSTEM

(71) Applicant: Accenture Global Solutions Limited, Dublin (IE)

(72) Inventors: Vaibhav Mahendrabhai Shah, Pune (IN); Hirendra Parihar, Indore (IN); Nikhil Prakash Bhandari, Pune (IN); Ankit Gupta, Phursungi (IN); Vikash Kumar, Ranchi (IN); Shrikant Chouthamal Sarda, Pune (IN); Shraban Nayak, Bangaluru (IN)

(73) Assignee: Accenture Global Solutions Limited, Dublin (IE)

( * ) Notice: Subject to any disclaimer, the term of this patent is extended or adjusted under 35 U.S.C. 154(b) by 208 days.

(21) Appl. No.: 16/905,436

(22) Filed: Jun. 18, 2020

(65) Prior Publication Data
US 2021/0349865 A1 Nov. 11, 2021

(30) Foreign Application Priority Data
May 6, 2020 (IN) .............................. 202041019281

(51) Int. Cl.
*G06F 16/21* (2019.01)
*G06F 16/28* (2019.01)
(Continued)

(52) U.S. Cl.
CPC .............. *G06F 16/214* (2019.01); *G06F 9/54* (2013.01); *G06F 16/288* (2019.01); *G06N 5/04* (2013.01);
(Continued)

(58) Field of Classification Search
None
See application file for complete search history.

(56) References Cited

U.S. PATENT DOCUMENTS

| 11,360,951 | B1 * | 6/2022 | Gilderman | ............ G06F 16/213 |
| 2018/0241642 | A1 * | 8/2018 | Patel | ................... G06F 9/45533 |

(Continued)

OTHER PUBLICATIONS

"Data Migration Strategy Plan," pp. 207-237, Retrieved from the Internet: [URL: https://link.springer.com/content/pdf/bbm%3A978-1-4842-5653-4%2F1.pdf].

(Continued)

*Primary Examiner* — Kim T Nguyen
(74) *Attorney, Agent, or Firm* — Harrity & Harrity, LLP

(57) ABSTRACT

A device may receive a request to migrate source data, associated with a source platform, to a target platform. The device may select a target template associated with the target platform based on the request; obtain target information based on the target template; and generate a target mapping based on the source data and the target information. The device may analyze the target mapping to identify an unmapped element in the target mapping and determine, using a migration analysis model, a candidate mapping, for the unmapped element, between a set of the source data and a target element of the target elements. The device may provide a notification that identifies the candidate mapping, to permit a user selection associated with verifying the candidate mapping. The device may receive the user selection and migrate the source data to the target platform according to the target mapping and the user selection.

20 Claims, 17 Drawing Sheets

(51) Int. Cl.
*G06Q 30/02* (2012.01)
*G06N 20/00* (2019.01)
*G06N 5/04* (2006.01)
*G06F 9/54* (2006.01)

(52) U.S. Cl.
CPC ......... *G06N 20/00* (2019.01); *G06Q 30/0283* (2013.01)

(56) References Cited

U.S. PATENT DOCUMENTS

| | | | |
|---|---|---|---|
| 2019/0052549 A1* | 2/2019 | Duggal | H04L 41/5019 |
| 2021/0255349 A1* | 8/2021 | Zhou | G01V 1/282 |
| 2021/0302606 A1* | 9/2021 | Al-Saleh | G01V 1/282 |
| 2021/0342785 A1* | 11/2021 | Mann | G06F 16/116 |
| 2021/0349865 A1* | 11/2021 | Shah | G06N 20/20 |
| 2021/0360083 A1* | 11/2021 | Duggal | H04L 67/34 |

OTHER PUBLICATIONS

Mohamed Hanine et al., "Data Migration Methodology from Relational to NoSQL Databases," International Journal of Computer, Electrical, Automation, Control and Information Engineering, 2015, vol. 9(12), pp. 2566-2570, Retrieved from the Internet [URL: https://www.researchgate.net/publication/327238670_Data_Migration_Methodology_from_Relational_to_NoSQL_Databases].

Sarmah et al., "Data Migration," Science and Technology, 2018, vol. 8(1), pp. 1-10, Retrieved from the Internet: [URL: https://www.researchgate.net/publication/336084389_Data_Migration].

\* cited by examiner

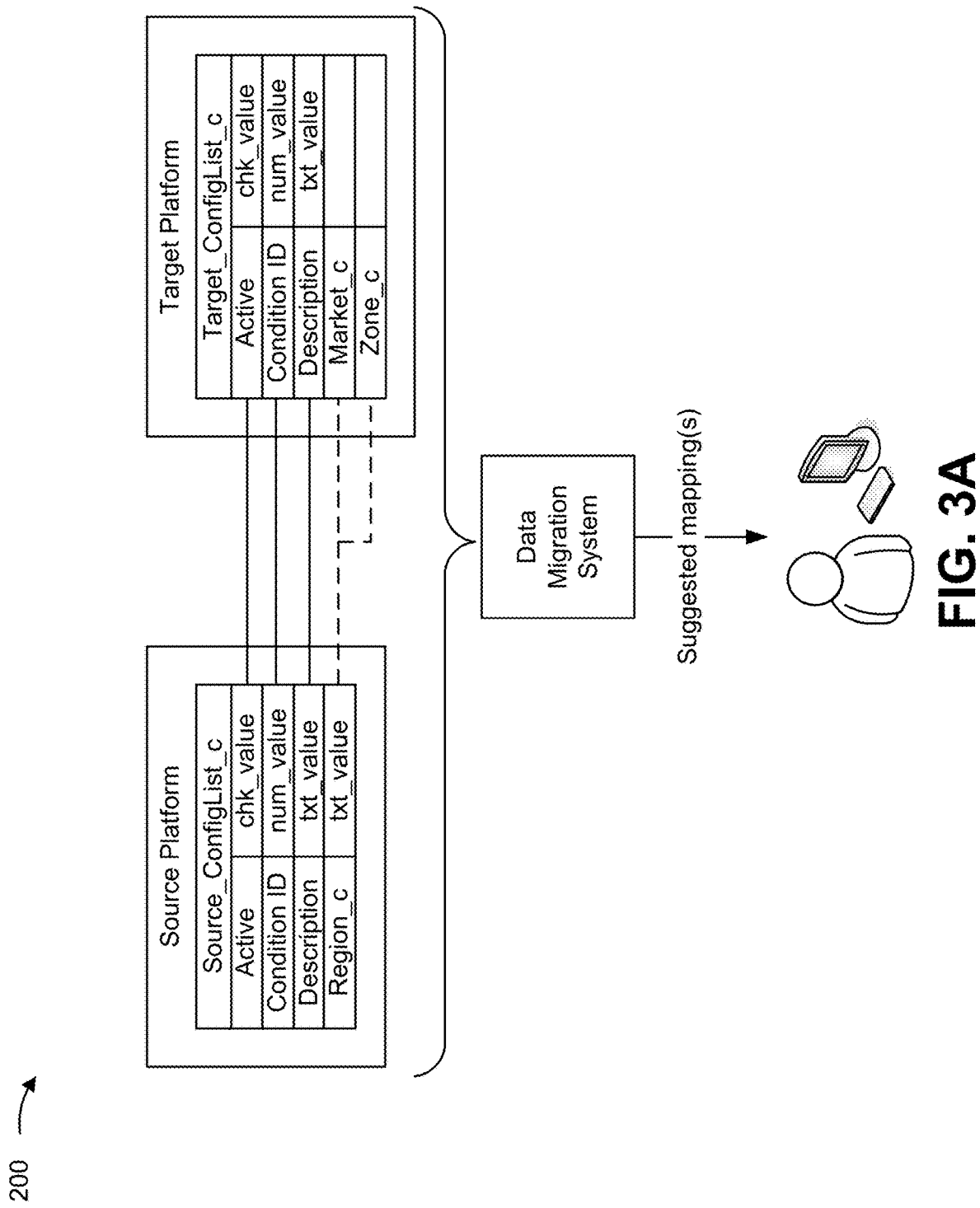

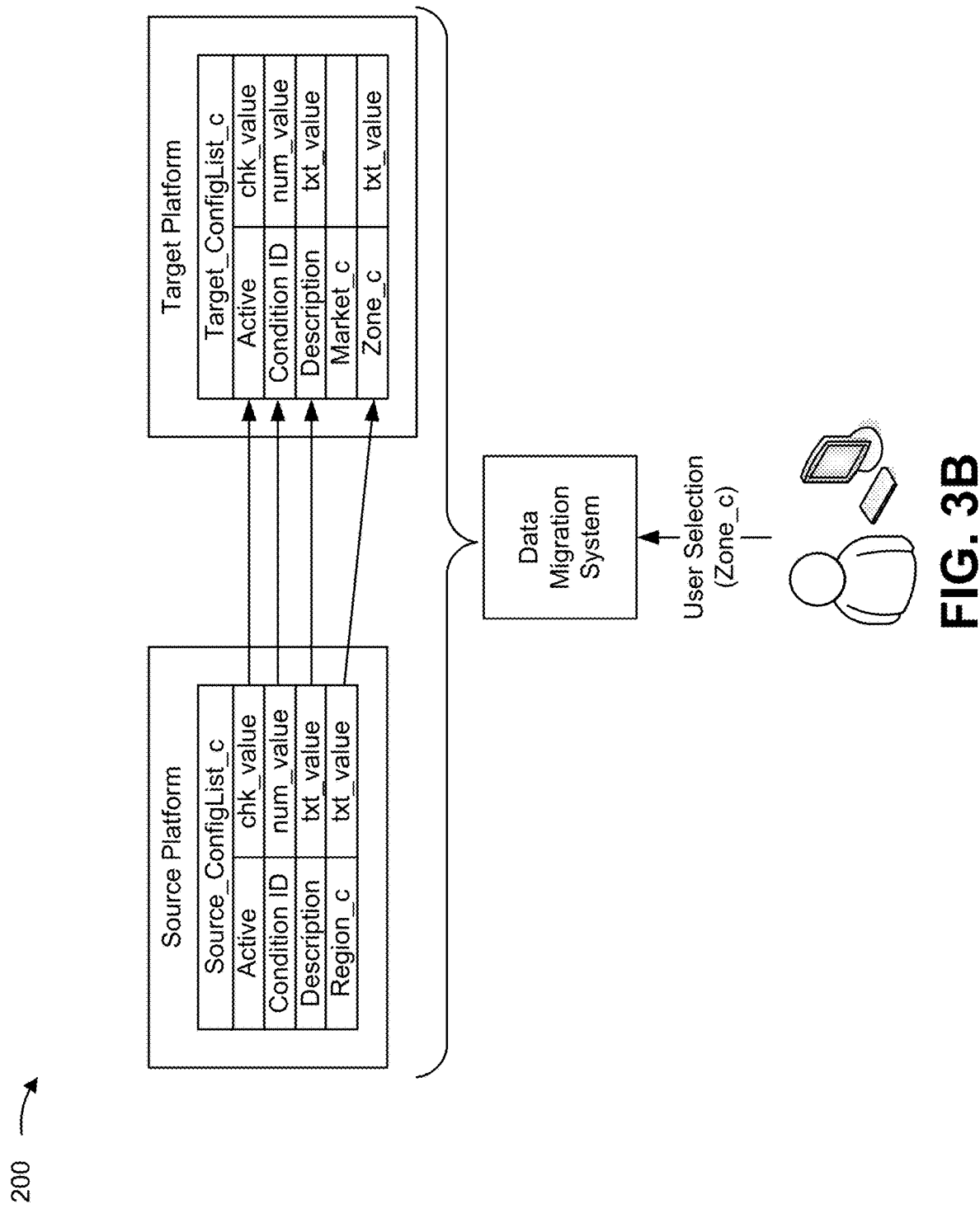

DATA MIGRATION SYSTEM

RELATED APPLICATION

This application claims priority to Indian Provisional Patent Application No. 202041019281, filed on May 6, 2020, and entitled "DATA MIGRATION SYSTEM", the content of which is incorporated by reference herein in its entirety.

BACKGROUND

Currently, companies are migrating data from source platforms to target platforms. Various techniques have been used to migrate data from the source platforms to the target platforms.

SUMMARY

According to some implementations, a method may include receiving, by a device, a request to migrate source data, associated with a source platform, to a target platform, wherein the request identifies the target platform; selecting, by the device, a target template, from a plurality of target templates, associated with the target platform based on the request, wherein the plurality of target templates are associated with a plurality of different target platforms; obtaining, by the device, target information based on the target template; generating, by the device, a target mapping based on the source data and the target information, wherein the target mapping maps individual sets of the source data to target elements of the target template based on the target information; analyzing, by the device, the target mapping to identify an unmapped element in the target mapping; determining, by the device and using a migration analysis model, a candidate mapping, for the unmapped element, between a set of the source data and a target element of the target elements, wherein the migration analysis model has been trained based on historical data associated with previous data migrations involving the source platform and the target platform; providing, by the device and to a user device, a notification that identifies the candidate mapping, to permit the user device to provide a user selection associated with verifying the candidate mapping; receiving, by the device, the user selection; and migrating, by the device, the source data to the target platform according to the target mapping and the user selection.

According to some implementations, a device may include one or more memories and one or more processors. In some implementations, the one or more processors are communicatively coupled to the one or more memories. The one or more processors may be configured to: receive a request to migrate source data associated with a source platform to a target platform, wherein the source platform and the target platform are associated with a configure price quote application, and wherein the request identifies the target platform; identify a target template associated with the target platform based on the request, wherein the target template includes target elements that permit the target platform to perform operations on the source data; identify target metadata associated with the target elements; generate a target mapping based on the target metadata and source metadata that is associated with the source data, wherein the target mapping maps individual sets of the source data with the target elements based on the source metadata and the target metadata; analyze the target mapping to identify an unmapped element in the target mapping; determine, using a migration analysis model, a candidate mapping, for the unmapped element, between a set of the source data and a target element of the target elements, wherein the migration analysis model is trained based on historical data associated with previous data migrations involving at least one of the source platform or the target platform; and migrate the source data to the target platform according to the target mapping and the candidate mapping.

According to some implementations, a non-transitory computer-readable medium may store one or more instructions. The one or more instructions, when executed by one or more processors, may cause the one or more processors to: receive a request to migrate source data associated with a source platform to a target platform, wherein the request identifies the target platform; identify a target template associated with the target platform based on the request; select, based on source metadata of the source data, target elements associated with the target template; obtain target metadata associated with target elements of the target template; determine, using a migration analysis model, a target mapping based on the target metadata and the source metadata, wherein the migration analysis model is trained based on historical data associated with previous data migrations involving the target platform, and wherein the target mapping maps individual sets of the source data to the target elements; and migrate the source data to the target platform according to the target mapping.

BRIEF DESCRIPTION OF THE DRAWINGS

FIGS. 3A-3C are diagrams of one or more example implementations described herein.

DETAILED DESCRIPTION

Figure 1A:
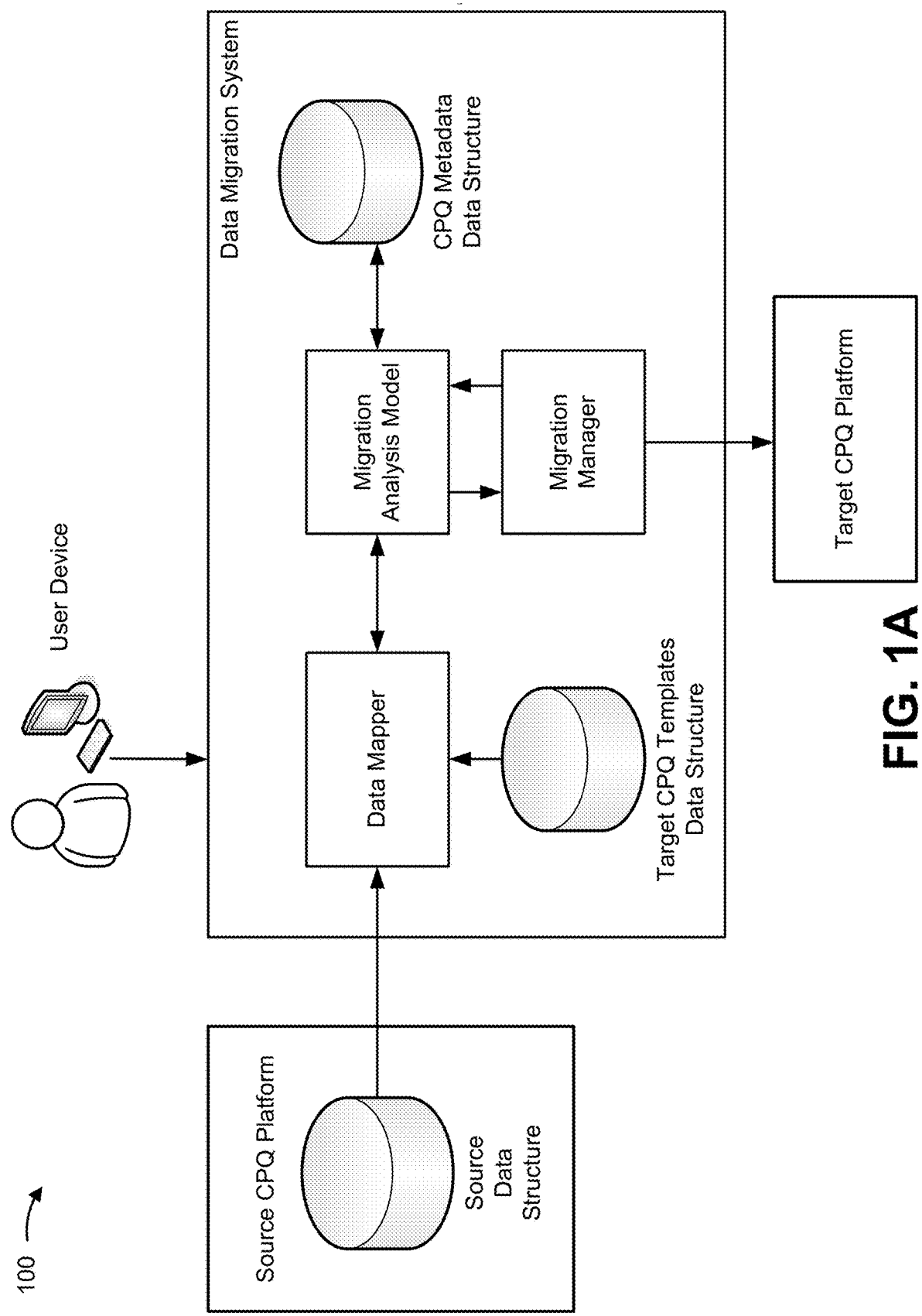
FIGS. 1A-1E are diagrams of one or more example implementations described herein.

The following detailed description of example implementations refers to the accompanying drawings. The same reference numbers in different drawings may identify the same or similar elements.

Prior techniques for migrating data from a source platform to a target platform are challenging, cumbersome, tedious, and dependent on manual intervention. For example, a skilled programmer (e.g., a skilled software designer and/or architect) may use computing resources, networking resources, and/or the like to identify the data (of the source platform) to be migrated, map fields, format, and/or the like of the data to fields, format, and/or the like of the target platform, identify particular data in the source platform that is not to be migrated, and transform and migrate the data from the source platform to the target platform. Furthermore, the migration described above may be disrupted when the particular data (from the source platform), that is not to be migrated to the target platform, is included in the migration and/or when human errors are introduced during the migration. Thus, prior techniques consume computing resources, networking resources, and/or the like associated with migrating the data from the source platform to the target platform based on incorrect mappings, identifying the incorrect mappings, correcting the incorrect mappings, resolving any issues arising out of data that is not to be migrated and/or human errors, reperforming the migration of the data from the source platform to the target platform, and/or like. Additionally, the prior techniques may have a negative impact on the performance of devices that rely on the integrity of the data migrated to the target platform, if the integrity of the data is compromised during the migration.

Some implementations described herein provide a data migration system that automatically analyzes source data of a source platform and maps the source data to target elements of a target platform in order to migrate the source data from the source platform to the target platform. For example, the data migration system may receive a request to migrate source data associated with the source platform to the target platform. The request may identify the target platform. The data migration system may identify a target template associated with the target platform based on the request and may select, based on source metadata of the source data, target elements associated with the target template. The data migration system may obtain target metadata associated with target elements of the target template and determine, using a migration analysis model, a target mapping based on the target metadata and the source metadata. In some implementations, the migration analysis model was trained based on historical data associated with previous data migrations involving the target platform. The target mapping may map individual sets of the source data to the target elements. The data migration system may migrate the source data to the target platform according to the target mapping.

In this way, the data migration system may intelligently analyze and understand a data structure of the source platform and a data structure of the target platform (e.g., based on an existing target template for migrating data to the target platform). The data migration system may identify, based on information regarding the target platform, the target template, from target templates associated with different target platforms, for migrating the source data to the target platform. The data migration system may determine, using a migration analysis model, a target mapping for the source data based on the target template. Based on using the target template and the migration analysis model, the data migration system may efficiently and accurately migrate the source data from the source platform to the target platform. In this regard, using the data migration system conserves computing resources (e.g., processing resources, memory resources, communication resources, and/or the like), networking resources, and/or the like associated with migrating data from the source platform to the target platform that would have otherwise been used to identify the incorrect mappings, correct the incorrect mappings, resolve any issues arising out of data incompatibility and/or human errors, reperforming the migration of the data from the source platform to the target platform, and/or like (as explained above with respect to the prior techniques of migrating data). Additionally, using the data migration system may maintain the integrity of the source data migrated to the target platform, thereby improving the performance of devices that rely on the integrity of the source data migrated to the target platform.

FIGS. 1A-1E are diagrams of one or more example implementations 100 described herein. In example implementation(s) 100, a data migration system may facilitate the migration of data from a source platform to a target platform. A user (e.g., any individual that has an interest in migrating data from one platform to another platform) may utilize the data migration system to migrate data from the source platform to the target platform, as described herein.

As shown in FIG. 1A, example implementation(s) 100 may include a user device, a source configure price quote (CPQ) platform, a target CPQ platform, and the data migration system. The user device, the source CPQ platform, the target CPQ platform, and the data migration system are further described below in connection with FIG. 4. The user device may include a mobile device, a computer, and/or the like. The source CPQ platform may be hosted by a cloud computing environment or by one or more server devices. As shown in FIG. 1A, the source CPQ platform may include a source data structure. The source data structure may include a data structure (e.g., a data warehouse, a database engine, a data repository, a data center, a cloud computing resource, and/or the like) from which data is to be migrated. The target CPQ platform may be hosted by a cloud computing environment or by one or more server devices. The target CPQ platform may include a target data structure (not shown). The target data structure may include a data structure (e.g., a data warehouse, a database engine, a data repository, a data center, a cloud computing resource, and/or the like) to which the data from the source data structure is to be migrated.

As used herein, a CPQ is a software platform that enables companies to generate quotes for various types of products. The source CPQ platform and the target CPQ platform are provided merely as examples. Other examples may differ from what is described with regard to FIGS. 1A-1E. For example, the source platform and/or the target platform may be any software platform that generates, processes, and/or stores data. For instance, while example implementation(s) 100 may refer to migrating data from a source CPQ platform to a target CPQ platform, the disclosure is applicable to migrating data from a source platform (that is not a CPQ platform) to a target platform (that is not a CPQ platform), from a source CPQ platform to a target platform (that is not a CPQ platform), and/or the like.

The data migration system may be hosted by a cloud computing environment or by one or more server devices, and may be associated with one or more user devices, source CPQ platforms, and/or target platforms (e.g., including the user device, the source CPQ platform, and the target CPQ platform discussed above). In some implementations, the cloud computing environment or the one or more server devices may be the same as or different than the cloud computing environment or the one or more server devices of the source CPQ platform and/or the cloud computing environment or the one or more server devices of the target CPQ platform. For example, an instance of the data migration system may be implemented on the source CPQ platform, implemented on the target CPQ platform, or distributed and implemented on both the source CPQ platform and the target CPQ platform.

As shown in FIG. 1A, the data migration system may include a data mapper, a target CPQ templates data structure, a migration analysis model, a migration manager, and a CPQ metadata data structure. The data mapper may include one or more devices that identify and/or select target CPQ templates associated with different target CPQ platforms and may map data from source CPQ platforms to information included in the target CPQ templates. The target CPQ templates data structure may include a data structure (e.g., a data warehouse, a database engine, a data repository, a data center, a cloud computing resource, and/or the like) that stores the target CPQ templates. The target CPQ templates may include information that may be used for mapping data from source CPQ platforms.

The migration analysis model may include a machine learning model. The migration analysis model may use the migration analysis model to identify a target mapping for source data when the source data cannot be mapped to information included in the target CPQ template. The migration manager may include one or more devices that may cause data to be migrated from source CPQ platforms to target CPQ platforms after source data has been mapped. The CPQ metadata data structure may include a data structure (e.g., a data warehouse, a database engine, a data repository, a data center, a cloud computing resource, and/or the like) that stores source metadata (of previous source data) in association with target metadata (associated with target CPQ platforms). The data mapper, the target CPQ templates data structure, the migration analysis model, the migration manager, and the CPQ metadata data structure will be described in more detail below.

Figure 1B:
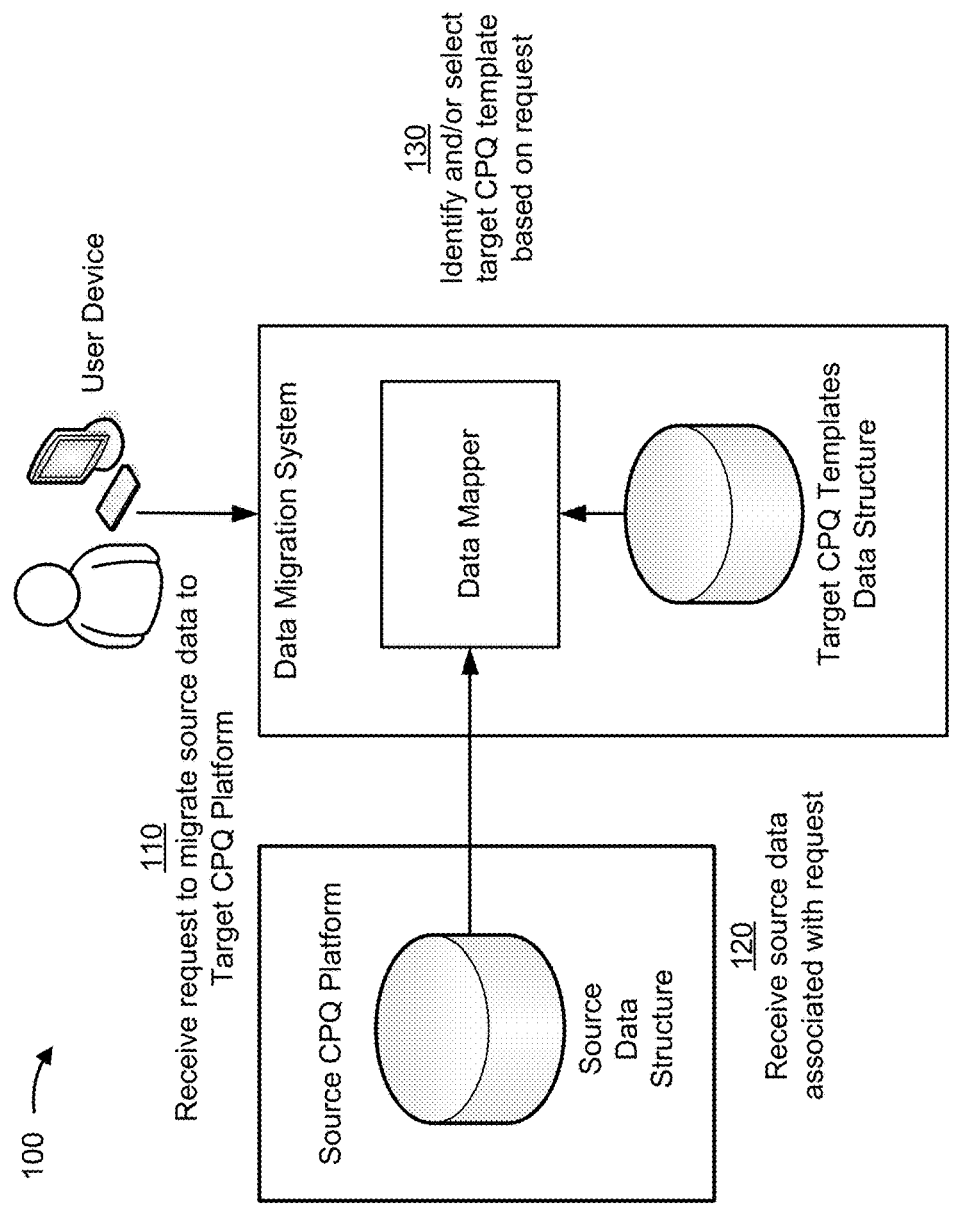

As shown in FIG. 1B, and by reference number 110, the data migration system may receive a request to migrate source data, of the source CPQ platform, to the target CPQ platform. For example, the data migration system may provide a user interface to the user device. The request may be submitted, using the user device, via the user interface and the data migration system may receive the request (submitted via the user interface) from the user device.

In some implementations, the data migration system may provide a prompt, via the user interface, for credentials of a user associated with the user device and may receive, from the user device, the credentials submitted via the user interface. The credentials may be used (by the data migration system) to authenticate the user to access the data migration system. The credentials may include a username, a password, a passcode, a biometric, and/or the like of the user. The data migration system may receive the request after authenticating the user using the credentials.

The request may include information such as, for example, information identifying the user, information identifying the user device, information identifying the source CPQ platform, information identifying the source data, information identifying the source data structure storing the source data, information identifying the target CPQ platform, and/or the like.

As shown in FIG. 1B, and by reference number 120, the data migration system may receive the source data associated with the request. For example, the data mapper (of the data migration system) may use the information included in the request to obtain the source data from the source CPQ data structure. For instance, the information identifying the source CPQ platform (included in the request) may include a name, an identifier, a network address, and/or the like of one or more first devices hosting the source CPQ platform. The information identifying the source data structure (included in the request) may include a name, a network address, and/or the like of one or more second devices hosting the source data structure. The one or more first devices may be the same as or different than the one or more second devices. The information identifying the source data (included in the request) may include a name, an identifier, a description, and/or the like. In this regard, the data mapper may use the information identifying the source CPQ platform and/or the information identifying the source data structure to identify a device (out of the one or more first devices and/or the one or more second devices) that hosts the source data structure and may use the information identifying the source data to obtain the source data from the source data structure. For example, the data mapper may cause a data request to be executed on the source data structure, using the information identifying the source data, to obtain the source data from the source data structure.

The source data may include information identifying an entity associated with the source data, an item, one or more objects (e.g., one or more data objects) associated with the item, one or more parameters (e.g., a name, an identifier, a description, a classification, a type, and/or the like) of the one or more objects, a configuration (e.g., a set of parameters) of the one or more objects, source metadata (e.g., the information identifying the one or more parameters, a name, an identifier, a description, a type, and/or the like) of the one or more objects, a rule associated with the one or more objects, one or more groups of objects, and/or the like. The rule may include information identifying a relationship between the one or more objects. The source data and the one or more objects of the source data will be described in more detail below.

As shown in FIG. 1B, and by reference number 130, the data migration system may identify and/or select (from the target CPQ template data structure) a target CPQ template based on the request. In this regard, the information identifying the target CPQ platform (included in the request) may include a name, an identifier, and/or the like of the target CPQ platform. The target CPQ template data structure may store target CPQ templates (or target templates) associated with different target CPQ platforms. The target CPQ templates may be stored, in the target CPQ templates data structure, in association with information identifying the different target CPQ platforms. Accordingly, the data mapper (of the data migration system) may use the information identifying the target CPQ platform, in the request, to identify and/or obtain the target CPQ template from the target CPQ templates data structure.

The target CPQ template (or target template) may include a file, a document, and/or the like that includes target information. The target information may include, for example, information identifying an item, one or more objects (e.g., one or more data objects) associated with the item, one or more parameters (e.g., a name, an identifier, a description, a classification, a type, and/or the like) of the one or more objects, a configuration (e.g., a set of parameters) of the one or more objects, one or more application programming interfaces (APIs) of the one or more objects, target metadata (e.g., the information identifying the one or more parameters, a name, an identifier, a description, a type, and/or the like) of the one or more objects, a rule associated with the one or more objects, one or more groups of objects, and/or the like. The rule may include information identifying a relationship between the one or more objects. The target information included in the target CPQ template may be used (e.g., by the data mapper) for mapping the source data. The target CPQ template and the one or more objects of the target information will be described in more detail below.

Figure 1C:
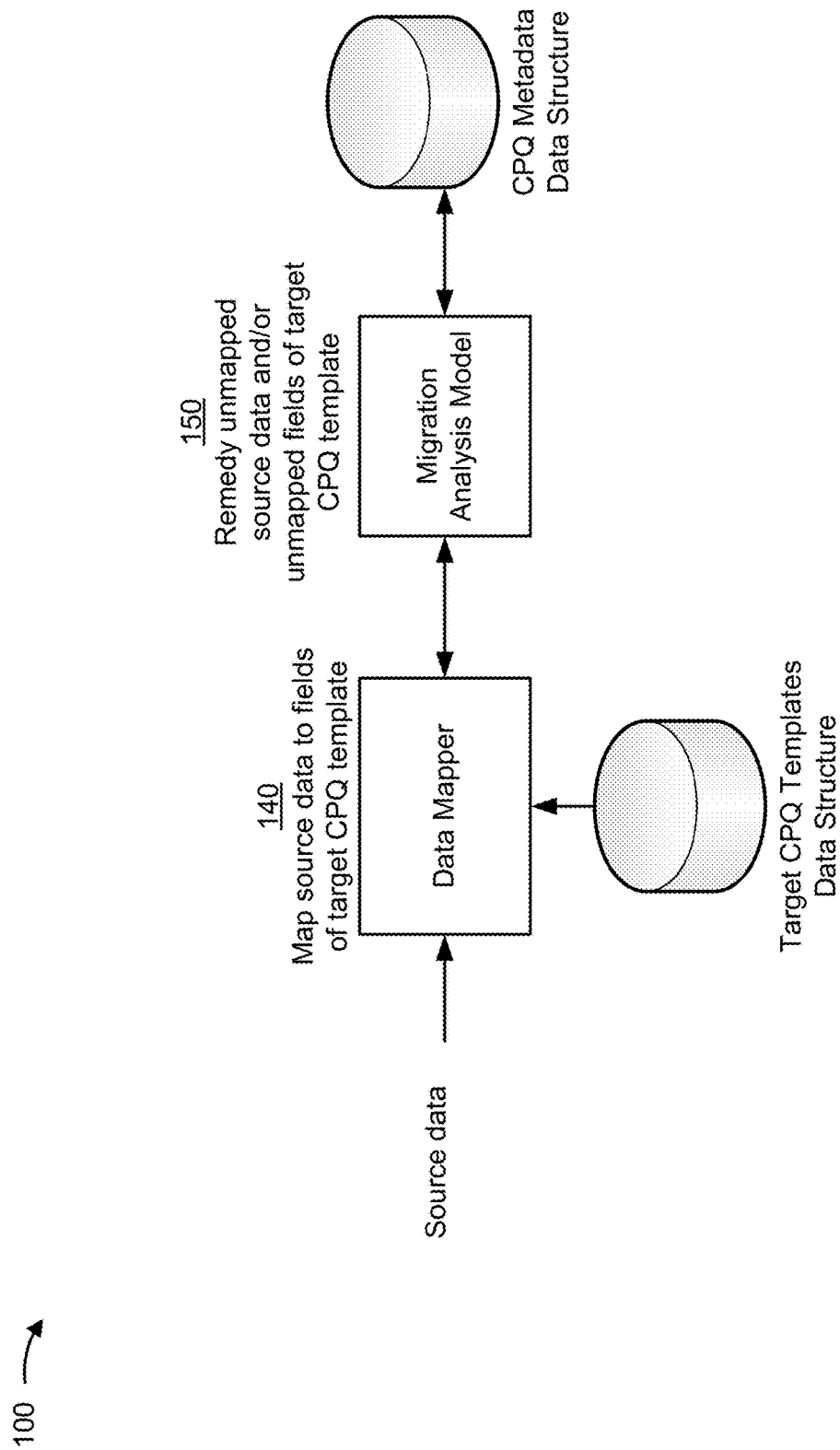

As shown in FIG. 1C, and by reference number 140, the data migration system may map the source data to fields of the target CPQ template. For example, the data mapper may obtain the source metadata from the source data and obtain the target metadata from the target information. The data mapper may compare the source metadata and the target metadata to identify matching data between the source metadata and the target metadata and to identify data that does not match between the source metadata and the target metadata, as explained below. For example, the data mapper may compare the source metadata of the one or more objects (of the source data) and the target metadata of the one or more objects (of the target data).

As an example, an object may include one or more fields (or parameters) and one or more values of the one or more fields. Metadata of an object may include information identifying the object (e.g., a name, an identifier, a description, a type, and/or the like of the object), information identifying the one or more fields (e.g., a name, an identifier, a description, a type, a location within the object, and/or the like of the one or more fields), the one or more values of the one or more fields, and/or the like. Accordingly, when comparing the source metadata of the one or more objects (of the source data) and the target metadata of the one or more objects (of the target data), the data mapper may compare the information identifying a first object (of the one or more objects of the source data) and the information identifying objects (of the one or more objects of the target data) to determine whether the target CPQ template includes a corresponding object. If the target CPQ template includes the corresponding object, the data mapper may compare the information identifying a first field (of the one or more fields of the first object) to the one or more fields of the corresponding object to determine whether the target CPQ template includes a corresponding first field, compare the information identifying a second field (of the one or more fields of the first object) to the one or more fields of the corresponding object to determine whether the target CPQ template includes a corresponding second field, and so on. The data mapper may perform the comparisons using character-based comparison techniques, fuzzy logic techniques, a semantic-based comparison, and/or the like. The data mapper may perform the comparisons above for each object of the one or more objects of the source data and for each field of each object. The data mapper may determine a rule associated with each object. For example, the rule may identify additional object (s) associated with each object and a relationship between the additional object(s) and the object. Additionally, or alternatively, the data mapper may compare object(s) and associated field(s) of the target CPQ template and the source data (e.g., to determine whether the source data includes an object included in the target CPQ template, as will be described in more detail below with respect to FIG. 3C) and may determine a rule associated with each object, in a manner similar to the manner described above.

Based on the comparisons, the data mapper may generate a target mapping. For example, if the data mapper determines that the target CPQ template includes the corresponding object, the data mapper may map information identifying the first object to information identifying the corresponding object. The data mapper may map information regarding the rule associated with the first object to information regarding a rule associated with the corresponding object. If the data mapper determines that the target CPQ template includes the corresponding first field, the data mapper may map information identifying the first field to information identifying the corresponding first field. If the data mapper determines that the target CPQ template includes the corresponding second field, the data mapper may map information identifying the second field to information identifying the corresponding second field. In this regard, the data mapper may stage objects in the target CPQ template by creating metadata for any corresponding object and/or field in the target template (as shown in FIG. 3A, for example).

For example, the target mapping may include a set of mapping rules that maps individual sets of the source data (e.g., an object, associated field(s), a rule, and/or the like of the source data) to target elements of the target CPQ template (e.g., corresponding object, field(s), rule, and/or the like of the target CPQ template). The data mapper may include, in the target mapping, information identifying any unmapped element such as, for example, object(s) and/or field(s) of the source data not mapped to the target CPQ template, object(s) and/or field(s) of the target CPQ template not mapped to the source data, and/or the like. In other words, there may be one or more objects, fields, and/or the like of the source data for which there are no corresponding objects, fields, and/or the like in the target CPQ template. Likewise, there may be one or more objects, fields, and/or the like of the target CPQ template for which there are no corresponding objects fields, and/or the like in the source data. The data migration system may determine a mapping for unmapped element(s) using a migration analysis model, as explained in more detail below.

Using the data migration system (e.g., the data mapper) to generate the target mapping (as explained above) conserves computing resources (e.g., processing resources, memory resources, communication resources, and/or the like), networking resources, and/or the like associated with migrating data from a source platform to a target platform that would have otherwise been used by prior systems to identify incorrect mappings and/or correct the incorrect mappings.

The comparisons and the determinations described above are provided merely as examples. Other examples may differ from what is described with regard to the comparisons and the determinations above.

As shown in FIG. 1C, and by reference number 150, the data migration system may remedy unmapped source data and/or unmapped fields of target CPQ template. For example, the data migration system (e.g., the data mapper) may obtain, from the target mapping, the information identifying an unmapped element and use the migration analysis model to determine a candidate mapping for the unmapped element.

In some implementations, the data migration system may train the migration analysis model with historical data (e.g., historical data identifying mappings between source objects of historical source data and target objects of historical target data, mappings between parameters of the source objects and parameters of the target objects, rules associated with the source objects, rules associated with the target objects, and/or the like) to determine mappings for unmapped elements. The historical data may include metadata of the source objects, the target objects, parameters of the source objects, parameters of the target objects, the rules associated with the source objects, the rules associated with the target objects. The mappings of the historical data may be based on historical data regarding target mappings (e.g., generated by the data mapper), annotation data associating the historical source data (e.g., metadata of objects, parameters, and/or rules) with the historical target data (e.g., metadata of objects, parameters, and/or rules), and/or the like. The historical data (used to train the migration analysis model) may include the historical data regarding the target mappings and the annotation data. The historical data regarding the annotation data may include information identifying a quantity of times that an object (from the historical source data) has been associated with an object (from the historical target data), a parameter (from the historical source data) has been associated with a parameter (from the historical target data), and so on. In some implementations, the historical data may include historical data of previous data migrations involving the source CPQ platform and/or the target CPQ platform. For example, the historical data of the previous data migrations may include information indicating an object (e.g., a particular type of object) of the source CPQ platform was mapped to a corresponding object of the target CPQ platform, a field of the source CPQ platform was mapped to a field of the target CPQ platform, and so on. The historical source data may include the source data and the historical target data may include the target CPQ template.

The data migration system may train the migration analysis model in a manner similar to the manner described below in connection with FIG. 4. Alternatively, rather than training the migration analysis model, the data migration system may obtain the migration analysis model from another system or device that trained the migration analysis model. In this case, the other system or device may obtain the historical data (e.g., the historical data discussed above) for use in training the migration analysis model, and may periodically receive additional data that the other system or device may use to retrain or update the migration analysis model.

In some implementations, the historical data may be stored in the CPQ metadata data structure. As explained above, the CPQ metadata data structure may store metadata of an object of a source platform, a parameter of the object, a rule of the object, and/or the like in association with metadata of a corresponding object of a target platform, a parameter of the corresponding object, a rule of the corresponding object, and/or the like. The CPQ metadata data structure may periodically receive additional data that may be used (e.g., by the data migration system, the other system or device, and/or the like) to retrain the migration analysis model in order to update the machine learning model, as will be explained in more detail.

The data migration system (e.g., the data mapper) may process the information identifying the unmapped element and/or the target mapping, using the migration analysis model, to identify the candidate mapping. For example, the data migration system, using the migration analysis model, may analyze the information identifying the unmapped element to identify one or more corresponding target elements of the target CPQ template and may predict a corresponding target element (out of the one or more corresponding target elements) that matches the unmapped element. For instance, the corresponding target element may be selected based on a quantity of times that the corresponding target element has been selected to be associated with the unmapped element, based on a degree of likelihood of match with the unmapped element (e.g., as a result of comparing the information identifying the unmapped element and information identifying the one or more target elements), and/or the like. The data migration system may use the migration analysis model to process the information identifying the unmapped element and/or the target mapping in a manner similar to the manner described below in connection with FIG. 5.

The techniques used to identify the candidate mapping discussed above are provided merely as examples. Other examples may differ from what is described with regard to the technique described above.

Figure 1D:
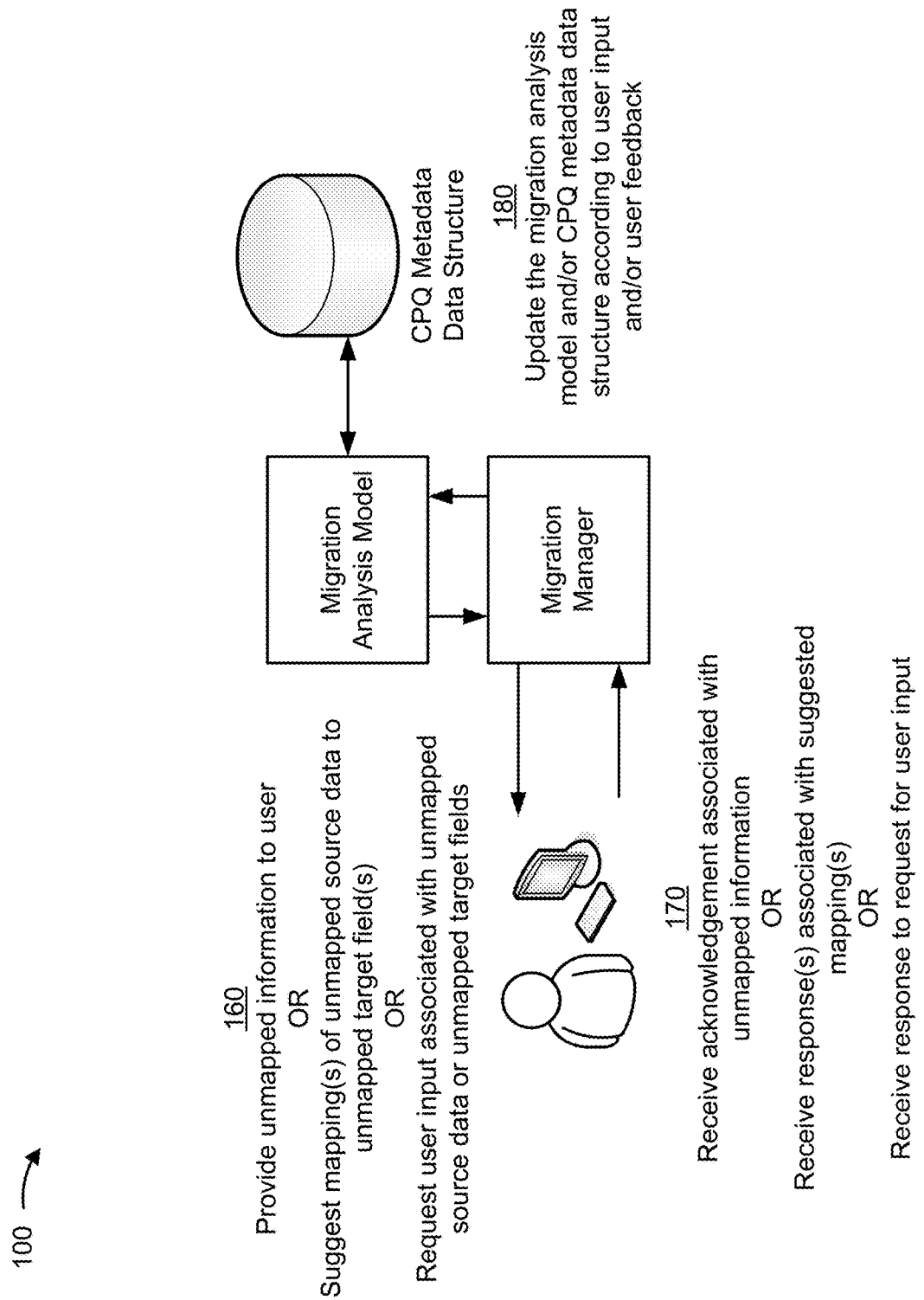

As shown in FIG. 1D, and by reference number 160, the data migration system may provide unmapped information, or may suggest mapping(s) of unmapped source data to unmapped target field(s), or may request user input associated with unmapped source data or unmapped target fields. The data migration system (e.g., the migration manager) may provide a user interface to the user device. In some implementations, the data migration system may provide, via the user interface, information indicating that the unmapped element was not mapped. The information indicating that the unmapped element was not mapped may include the information identifying (e.g., a name, identifier, type, description, and/or the like) the unmapped element and may provide, via the user interface, an option for a user acknowledgment of the unmapped element and/or an option to request a suggestion (or a recommendation) for mapping the unmapped element. The user may submit, using the user device, the user acknowledgement by selecting the option for the user acknowledgement via the user interface and/or submit, using the user device, the request for the suggestion for mapping the unmapped element.

Additionally, or alternatively, the data migration system may provide, via the user interface, the information identifying (e.g., a name, identifier, type, description, and/or the like) the unmapped element, information identifying (e.g., a name, identifier, type, description, and/or the like) the target element, and information indicating that the target element is suggested for mapping to the unmapped element. For example, if the unmapped element is an object of the source data, the information identifying the unmapped element may include information identifying the object of the source data and the information identifying the target element may include the target CPQ template and information identifying a matching object of the target CPQ template (e.g., as a suggestion or candidate mapping). If the unmapped element is a parameter of an object of the source data, the information identifying the unmapped element may include information identifying the parameter and/or the object of the source data and the information identifying the target element may include information identifying an object mapped to the object of the source data and information identifying a matching parameter (e.g., as a suggestion or candidate mapping). In some implementations, the data migration system may provide the information identifying the unmapped element, the information identifying the target element, and the information indicating that the target element is suggested for mapping to the unmapped element, based on receiving the request for the suggestion for mapping the unmapped element. The data migration system may perform similar operations if the unmapped element (e.g., identified using fuzzy logic techniques as described below) is an element of the target data, as described below with respect to FIG. 3C. For example, the data migration system may provide the information identifying the unmapped element (e.g., an object and one or more fields). In some implementations, based on user input via the user interface, the data migration system may generate metadata for the unmapped element and include the metadata in the source data.

Additionally, or alternatively, the data migration system may provide, via the user interface, an option for user confirmation of mapping the unmapped element to the target element and an option for user selection of another target element of the target CPQ template. For example, the user interface may provide a selectable item for the option for the user confirmation. The user may select, using the user device and via the user interface, the option for the user confirmation of mapping the unmapped element to the target element. Alternatively, the user may select the option for user selection of another target element of the target CPQ template and submit information identifying the other target element.

The information provided via the user interface discussed above is provided merely as an example. Other examples may differ from what is described with regard to the information described above.

As shown in FIG. 1D, and by reference number 170, the data migration system (e.g., the migration manager) may receive information indicating the user acknowledgement submitted by the user device via the user interface and/or the request for the suggestion for mapping the unmapped element. In some implementations, the data migration system may identify the candidate mapping based on receiving the information regarding the suggestion for mapping the unmapped element. Additionally, or alternatively, the data migration system (e.g., the migration manager) may receive information indicating a selection of the option for the user confirmation of mapping the unmapped element to the target element. Alternatively, the data migration system (e.g., the data mapper) may receive information indicating the selection of the option for user selection of another target element of the target CPQ template and the information identifying the other target element.

Using the data migration system (e.g., the data mapper and the migration analysis model) reduces or eliminates incorrect mappings and/or human errors, thereby conserving computing resources (e.g., processing resources, memory resources, communication resources, and/or the like), networking resources, and/or the like associated with migrating data from the source platform to the target platform that would have otherwise been used to identify the incorrect mappings, correct the incorrect mappings, resolve any issues arising out of human errors, reperforming the migration of the data from the source platform to the target platform, and/or like. Additionally, using the data migration system (e.g., the data mapper and the migration analysis model along with user input) may maintain the integrity of the source data migrated to the target platform, thereby improving the performance of devices that rely on the integrity of the source data migrated to the target platform.

As shown in FIG. 1D, and by reference number 180, the data migration system (e.g., the data mapper) may update the migration analysis model and/or update the CPQ metadata data structure according to user input and/or user feedback of the user of the user device. For example, the data migration system may update the historical data (used to train the migration analysis model) based on the information indicating the selection of the option for the user confirmation of mapping the unmapped element to the target element (identified by the data migration system), if the option for the user confirmation is selected. For instance, the data migration system may update the historical data to include information indicating that the unmapped element is to be mapped to the target element. In this regard, the historical data may include the information identifying the unmapped element and the information identify the target element. The data migration system may update the target mapping to include information indicating that the unmapped element is to be mapped to the target element. Alternatively, the data migration system may update the historical data based on the information indicating the selection of the option for the user selection of the other target element and the information identifying the other target element (e.g., if the option for the user selection of the other target element is selected). For instance, the data migration system may update the historical data to include information indicating that the unmapped element is to be mapped to the other target element based on the user selection. In this regard, the historical data may include the information identifying the unmapped element and the information identify the target element. The data migration system may update the target mapping to include information indicating that the unmapped element is to be mapped to the other target element. The data migration system may cause the migration analysis model to be updated using the updated historical data.

In addition, or alternatively, to updating the historical data, the data migration system may cause the CPQ metadata data structure to be updated based on the information indicating the selection of the option for the user confirmation, if the option for the user confirmation is selected. For example, the data migration system may update the CPQ metadata data structure to include the metadata of the unmapped element in association with the metadata of the target element. Alternatively, the data migration system may cause the CPQ metadata data structure to be updated based on the information indicating the selection of the option for the user selection of the other target element and the information identifying the other target element, if the option for the user selection of the other target element is selected. For example, the data migration system may update the CPQ metadata data structure to include the metadata of the unmapped element in association with the metadata of the other target element.

Updating the historical data and the CPQ metadata data structure improves the accuracy and efficiency of the migration analysis model, thereby conserving computing resources (e.g., processing resources, memory resources, communication resources, and/or the like), networking resources, and/or the like that would have otherwise been used if the migration analysis model was not updated. Additionally, using an updated migration analysis model may maintain the integrity of the source data migrated to the target platform, thereby improving the performance of devices that rely on the integrity of the source data migrated to the target platform.

Figure 1E:
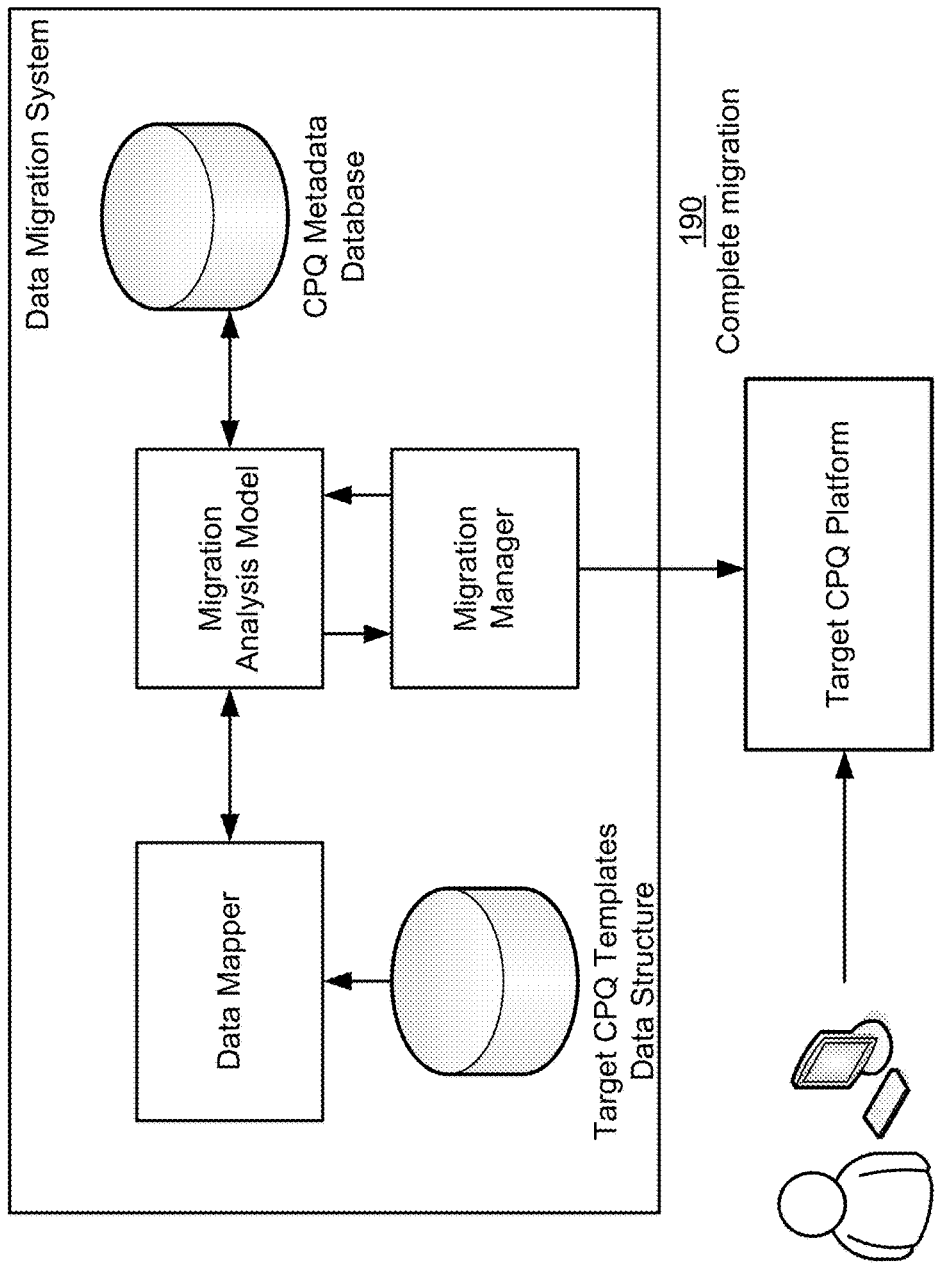

As shown in FIG. 1E, and by reference number 190, the data migration system (e.g., the migration manager) may complete the migration. The data migration system may migrate the source data to the target CPQ platform using the target mapping and the target CPQ template. For example, the data migration system may copy each object, each field associated with the object, a value of each field, a rule associated with the object, and/or the like to target elements of the target CPQ template (e.g., to each corresponding object, field, rule, and/or the like of the target CPQ template.

In some implementations, a corresponding object may be associated with one or more APIs. In this regard, the data migration system may analyze the target information (discussed above) of the target CPQ template to identify the one or more APIs associated with the corresponding object and may cause the object (of the source data), one or more fields of the objects, and their associated values to be integrated with the one or more APIs of the corresponding object. For example, the data migration system may map input of the one or more APIs to the object (of the source data), one or more fields of the objects, and/or their associated values. In some implementations, the one or more APIs may enable the data migration system to migrate specific data and/or metadata from the source data instead of migrating an entirety of the source data. In this regard, the data migration system may enable a user to select a portion of the source data (e.g., specific data and/or metadata) to be migrated.

Such integration may enable the target CPQ platform to perform one or more operations on the object (of the source data), one or more fields of the object, and their associated values. After completion of the migration, the user may be able to use the user device to access the migrated source data via the target CPQ platform. Such integration may maintain the integrity of the source data migrated to the target platform, thereby improving the performance of devices that rely on the integrity of the source data migrated to the target platform.

The source CPQ platform and the target CPQ platform are provided merely as examples. Other examples may differ from what is described with regard to FIGS. 1A-1E. For example, the data migration system, described herein, may be used to migrate data between any software platform that generates, processes, and/or stores data.

As indicated above, FIGS. 1A-1E are provided merely as an example. Other examples may differ from what is described with regard to FIGS. 1A-1E.

Figure 2A:
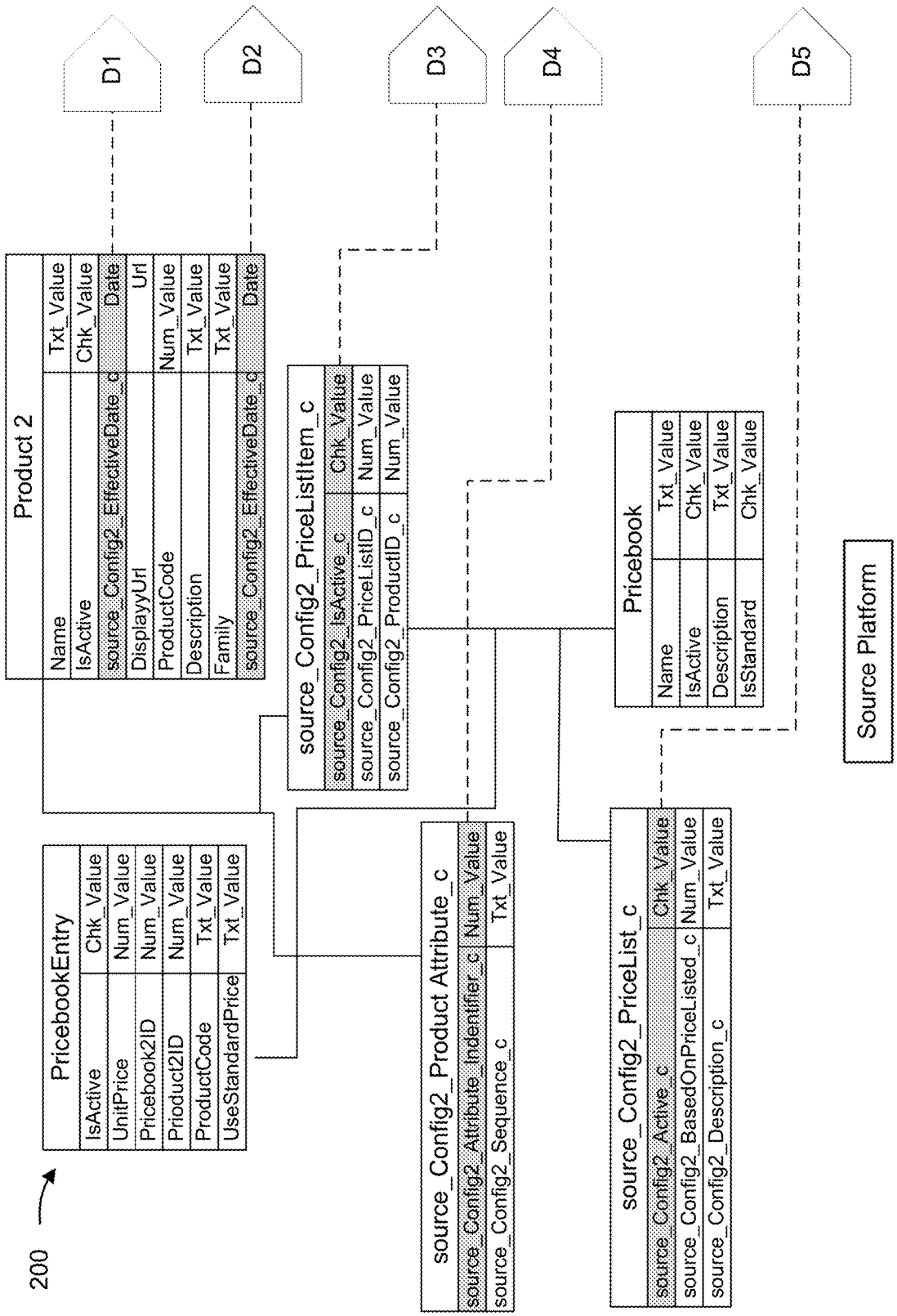
FIGS. 2A-2B are diagrams of one or more example implementations described herein.
Figure 2B:
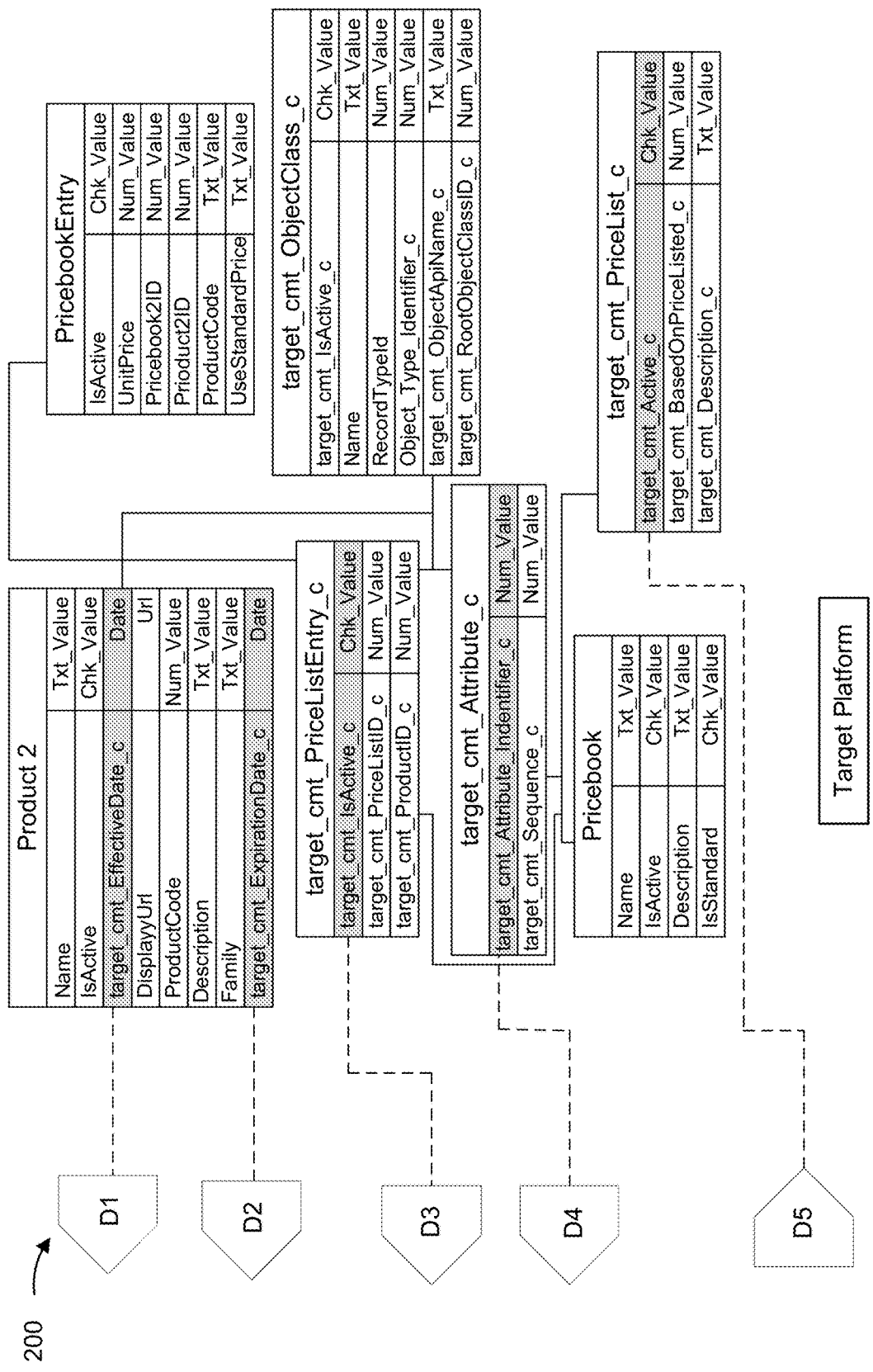

FIGS. 2A-2B are diagrams of one or more example implementations 200 described herein. FIG. 2A illustrates the source data of FIG. 1B and FIG. 2B illustrates the target CPQ template of FIG. 1B. As shown in FIG. 2A, the source data includes multiple objects and the multiple objects are associated with an item. In example implementation(s) 200, the item is "Product 2." In this regard, the objects may include a "Product 2" object which represents "Product 2," a "PricebookEntry" object which indicates that "Product 2" has a price entry in a price book, a "Pricebook" object representing the price book including an entry for "Product 2," a "source_Config2_PriceList_c" object which represents pricing of "Product 2" in different markets (e.g., different regions), a "source_Config2_PriceListItem_c" object which represents pricing of "Product 2" in a particular market, and a "source_Config2_Product Attribute_c" object which represents a group of products to which "Product 2" belong. As explained above, each object may be associated with one or more rules indicating a relationship between the object and other objects. The one or more rules are represented by solid lines between the objects. For example, as shown in FIG. 2A, the "Product 2" object is associated with a rule indicating a relationship with the "source_Config2_Product Attribute_c" object and another rule indicating a relationship with the "source_Config2_PriceListItem_c" object. In FIG. 2A, assume that the data migration system has analyzed the source data to identifying a target mapping, as discussed above. For example, as shown FIG. 2A, the data migration system has identified five fields (identified as D1 to D5) to be mapped to fields of corresponding objects of the target CPQ template (or target template), in a manner similar to the manner described above with respect to FIG. 1C.

As shown in FIG. 2B, the target CPQ template (associated with the target platform) may include corresponding objects, fields, and rules. The data migration system may cause the five fields of the source data to be mapped to the fields of the corresponding objects of the target CPQ template, in a manner similar to the manner described above with respect to FIG. 1C. Using the data migration system reduces or eliminates incorrect mappings and/or human errors, thereby conserving computing resources (e.g., processing resources, memory resources, communication resources, and/or the like), networking resources, and/or the like associated with migrating data from the source platform to the target platform that would have otherwise been used to identify the incorrect mappings, correct the incorrect mappings, resolve any issues arising out of data incompatibility and/or human errors, reperforming the migration of the data from the source platform to the target platform, and/or like.

As indicated above, FIGS. 2A-2B are provided merely as an example. Other examples may differ from what is described with regard to FIGS. 2A-2B.

Figure 3C:
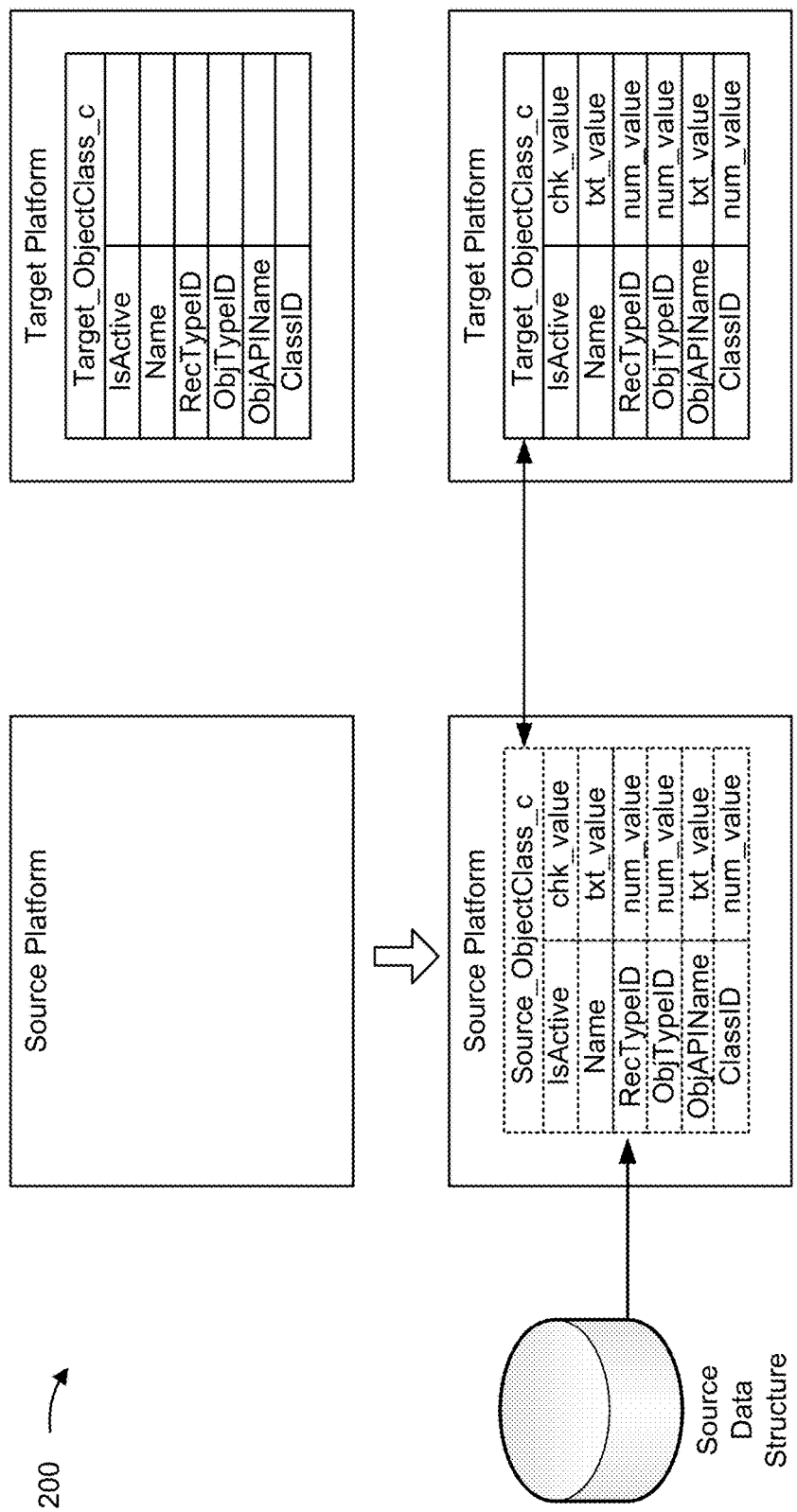
Figure 3C:
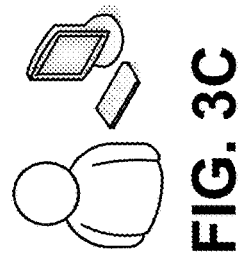

FIGS. 3A-3C are diagrams of one or more example implementations 300 described herein. As shown in FIG. 3A, the data migration system has identified source data of a source platform (e.g., a source object of the source platform) to be migrated to a target platform (e.g., a target object of the target platform). As shown in FIG. 3A, the data migration system has mapped multiple fields of the source object to corresponding fields of the target object, as illustrated by the solid lines. For example, the data migration system has copied the values of the fields of the source object to the corresponding fields of the target object.

As shown in FIG. 3A, the data migration system has not mapped the "Region_c" field of the source object (as illustrated by the dotted lines) because the target object does not include a "Region_c" field. As shown in FIG. 3A, the data migration system may determine a candidate mapping for the "Region_c" field, in a manner similar to the manner described above in FIG. 1C and may provide the candidate mapping as a suggestion to a user device (as illustrated by the dotted lines). For example, the candidate mapping may include information indicating the "Region_c" field may be mapped to the "Market_c" field of the target object or to the "Zone_c" field of the target object.

As shown in FIG. 3B, the data migration system may receive, from the user device, information indicating a user selection of the "Zone_c" field for the candidate mapping of the "Region_c," in a manner similar to the manner described above with respect to FIG. 1D. As shown in FIG. 3B, the data migration system may map the "Region_c" field to the "Zone_c" field. Incorporating user feedback during the use of the data migration system with may maintain the integrity of the source data migrated to the target platform, thereby improving the performance of devices that rely on the integrity of the source data migrated to the target platform.

As shown in FIG. 3C, the data migration system may determine that a target object of the target platform that is not included in the source platform (e.g., based on comparing target elements of the target platform and source data of the source platform). The data migration system may determine a target object template (associated with the target object) during a mapping process of source data of the source platform to target data of the target platform. Assume that the target object is used by the target platform. The data migration system may generate a source object template based on the target object template (including generating metadata for fields of the source object template) and may obtain, from a source data structure associated with the source platform, values for the fields of the source object template. As shown in FIG. 3C, the data migration system may include the values in the fields of the source object template to generate a source object. The data migration system may map the source object to the target object template as part of mapping the source data to the target data. In some implementations, the data migration system may provide to a user, via a user interface, information regarding the generated source object to obtain user confirmation or user update prior to mapping the generated source object, in a manner similar to the manner described above with respect to FIG. 1D.

Generating the source object, as described above, reduces the amount of time that would have taken a user to generate the source object and eliminates or reduces human error that may occur while generating the source object, thereby preserving computing resources (e.g., processing resources, memory resources, communication resources, and/or the like), networking resources, and/or the like associated with migrating data from the source platform to the target platform that would have otherwise been used to identify incorrect mappings, correct the incorrect mappings, resolve any issues arising out of human errors, and/or like.

As indicated above, FIGS. 3A-3C are provided merely as an example. Other examples may differ from what is described with regard to FIGS. 3A-3C.

Figure 4:
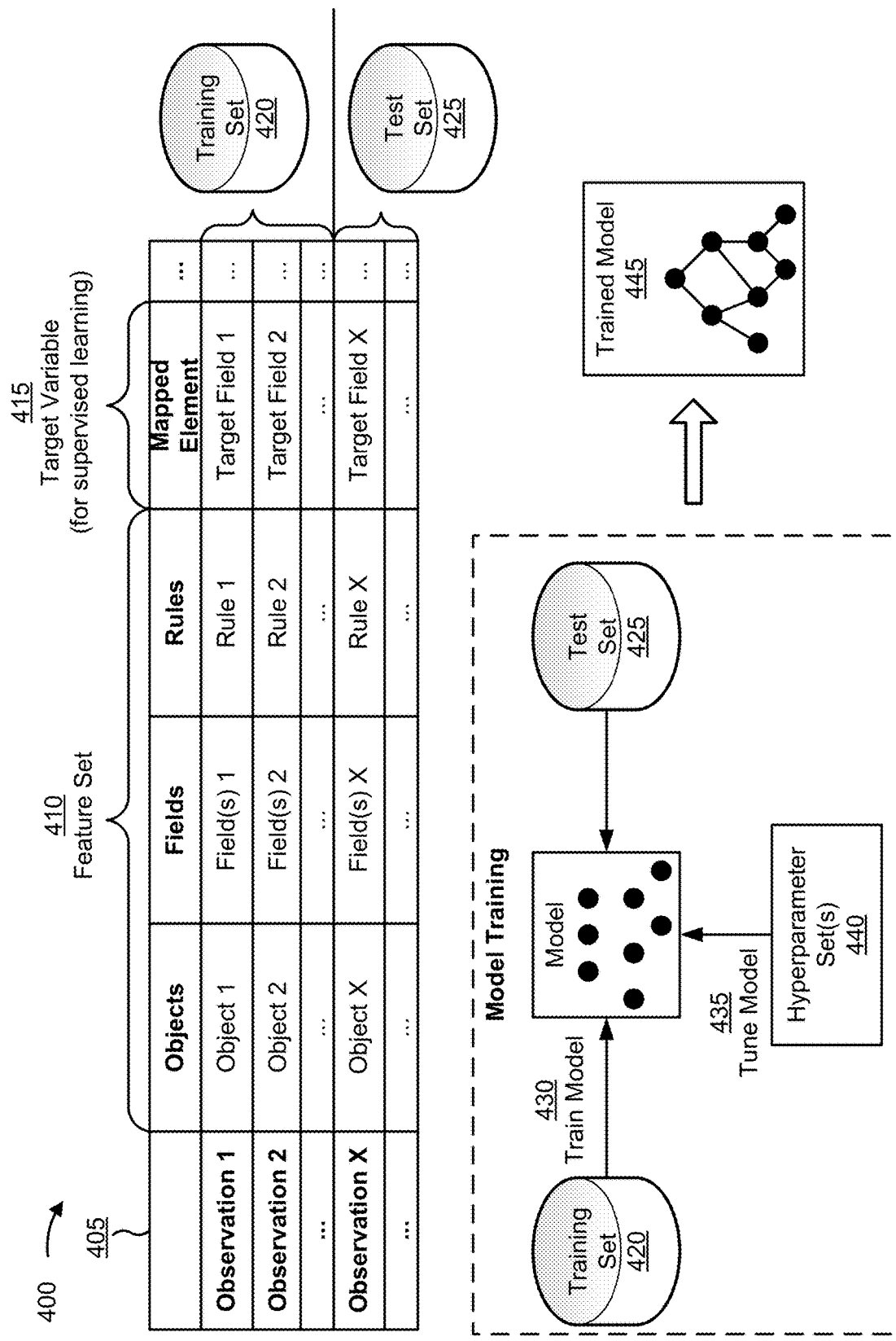
FIG. 4 is a diagram illustrating an example of training a machine learning model.

FIG. 4 is a diagram illustrating an example 400 of training a machine learning model. The machine learning model training described herein may be performed using a machine learning system. The machine learning system may include a computing device, a server, a cloud computing environment, and/or the like, such as the data migration system.

As shown by reference number 405, a machine learning model may be trained using a set of observations. The set of observations may be obtained and/or input from historical data, such as data gathered during one or more processes described herein. For example, the set of observations may include data gathered from user interaction with and/or user input to the data migration system, as described elsewhere herein. In some implementations, the machine learning system may receive the set of observations (e.g., as input) from the user device.

As shown by reference number 410, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the user device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the user device, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of objects, a second feature of fields, a third feature of rules, and so on. As shown, for a first observation, the first feature may have a value of object 1, the second feature may have a value of field(s) 1, the third feature may have a value of rule 1, and so on. These features and feature values are provided as examples, and may differ in other examples. For example, the feature set may include one or more of the following features: data identifying objects, fields, rules, previous mapping between objects, fields, rules, user input regarding mapping between objects, fields, rules, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 415, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 420 that includes a first subset of observations, of the set of observations, and a test set 425 that includes a second subset of observations of the set of observations. The training set 420 may be used to train (e.g., fit, tune, and/or the like) the machine learning model, while the test set 425 may be used to evaluate a machine learning model that is trained using the training set 420. For example, for supervised learning, the test set 425 may be used for initial model training using the first subset of observations, and the test set 425 may be used to test whether the trained model accurately predicts target variables in the second subset of observations. In some implementations, the machine learning system may partition the set of observations into the training set 420 and the test set 425 by including a first portion or a first percentage of the set of observations in the training set 420 (e.g., 75%, 80%, or 85%, among other examples) and including a second portion or a second percentage of the set of observations in the test set 425 (e.g., 25%, 20%, or 15%, among other examples). In some implementations, the machine learning system may randomly select observations to be included in the training set 420 and/or the test set 425.

As shown by reference number 430, the machine learning system may train a machine learning model using the training set 420. This training may include executing, by the machine learning system, a machine learning algorithm to determine a set of model parameters based on the training set 420. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 420). For example, for a regression algorithm, a model parameter may include a regression coefficient (e.g., a weight). For a decision tree algorithm, a model parameter may include a decision tree split location, as an example.

As shown by reference number 435, the machine learning system may use one or more hyperparameter sets 440 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 420. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 420. The machine learning system may tune each machine learning algorithm using one or more hyperparameter sets 440 (e.g., based on operator input that identifies hyperparameter sets 440 to be used, based on randomly generating hyperparameter values, and/or the like). The machine learning system may train a particular machine learning model using a specific machine learning algorithm and a corresponding hyperparameter set 440. In some implementations, the machine learning system may train multiple machine learning models to generate a set of model parameters for each machine learning model, where each machine learning model corresponds to a different combination of a machine learning algorithm and a hyperparameter set 440 for that machine learning algorithm.

In some implementations, the machine learning system may perform cross-validation when training a machine learning model. Cross validation can be used to obtain a reliable estimate of machine learning model performance using only the training set 420, and without using the test set 425, such as by splitting the training set 420 into a number of groups (e.g., based on operator input that identifies the number of groups, based on randomly selecting a number of groups, and/or the like) and using those groups to estimate model performance. For example, using k-fold cross-validation, observations in the training set 420 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 440 associated with a particular machine learning algorithm. The machine learning system may compare the overall cross-validation scores for different hyperparameter sets 440 associated with the particular machine learning algorithm, and may select the hyperparameter set 440 with the best (e.g., highest accuracy, lowest error, closest to a desired threshold, and/or the like) overall cross-validation score for training the machine learning model. The machine learning system may then train the machine learning model using the selected hyperparameter set 440, without cross-validation (e.g., using all of data in the training set 420 without any hold-out groups), to generate a single machine learning model for a particular machine learning algorithm. The machine learning system may then test this machine learning model using the test set 425 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 445 to be used to analyze new observations, as described below in connection with FIG. 5.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 420 (e.g., without cross-validation), and may test each machine learning model using the test set 425 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 445.

As indicated above, FIG. 4 is provided as an example. Other examples may differ from what is described in connection with FIG. 4. For example, the machine learning model may be trained using a different process than what is described in connection with FIG. 4. Additionally, or alternatively, the machine learning model may employ a different machine learning algorithm than what is described in connection with FIG. 4, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 5:
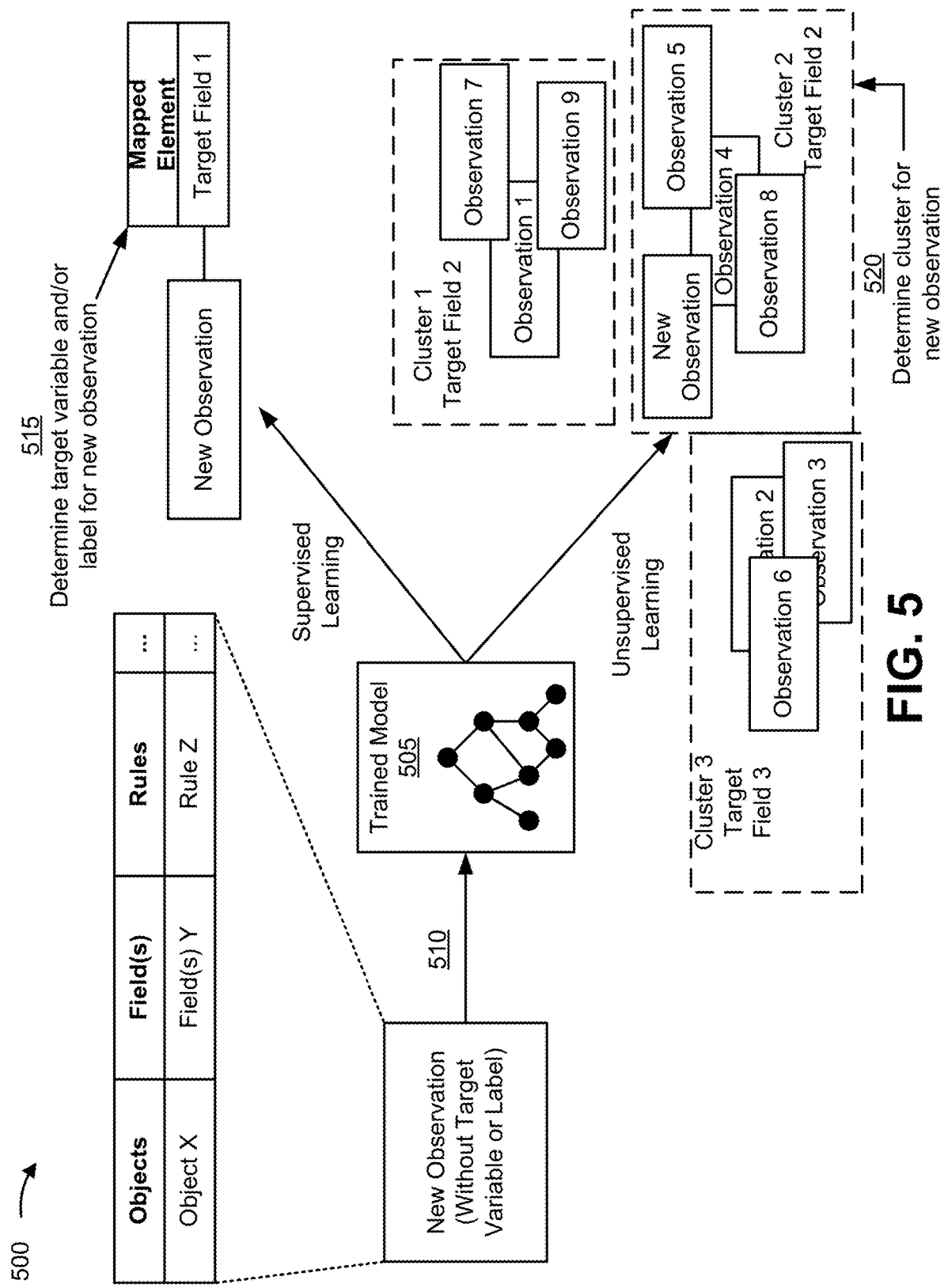
FIG. 5 is a diagram illustrating an example of applying a trained machine learning model to a new observation.

FIG. 5 is a diagram illustrating an example 500 of applying a trained machine learning model to a new observation. The new observation may be input to a machine learning system that stores a trained machine learning model 505. In some implementations, the trained machine learning model 505 may be the trained machine learning model 445 described above in connection with FIG. 4. The machine learning system may include a computing device, a server, a cloud computing environment, and/or the like, such as data migration system 601.

As shown by reference number 510, the machine learning system may receive a new observation (or a set of new observations), and may input the new observation to the machine learning model 505. As shown, the new observation may include a first feature of objects, a second feature of fields, a third feature of rules, and so on, as an example. The machine learning system may apply the trained machine learning model 505 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 505 may predict "map to target field 1" for the target variable of Mapped Element for the new observation, as shown by reference number 515. Based on this prediction (e.g., based on the value having a particular label/classification, based on the value satisfying or failing to satisfy a threshold, and/or the like), the machine learning system may provide a recommendation, such as target field 1. Additionally, or alternatively, the machine learning system may perform an automated action and/or may cause an automated action to be performed (e.g., by instructing another device to perform the automated action), such as data migration system 601. As another example, if the machine learning system were to predict a value of target field 2 for the target variable of Mapped Element, then the machine learning system may provide a different recommendation (e.g., "map to target field 2") and/or may perform or cause performance of a different automated action (e.g., "user input to confirm mapping to target field 2"). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In this way, the machine learning system may apply a rigorous and automated process to mapping data for data migration. The machine learning system enables recognition and/or identification of tens, hundreds, thousands, or millions of features and/or feature values for tens, hundreds, thousands, or millions of observations, thereby increasing an accuracy and consistency of mapping data for data migration relative to requiring computing resources to be allocated for tens, hundreds, or thousands of operators to manually map data for data migration using the features or feature values.

As indicated above, FIG. 5 is provided as an example. Other examples may differ from what is described in connection with FIG. 5.

Figure 6:
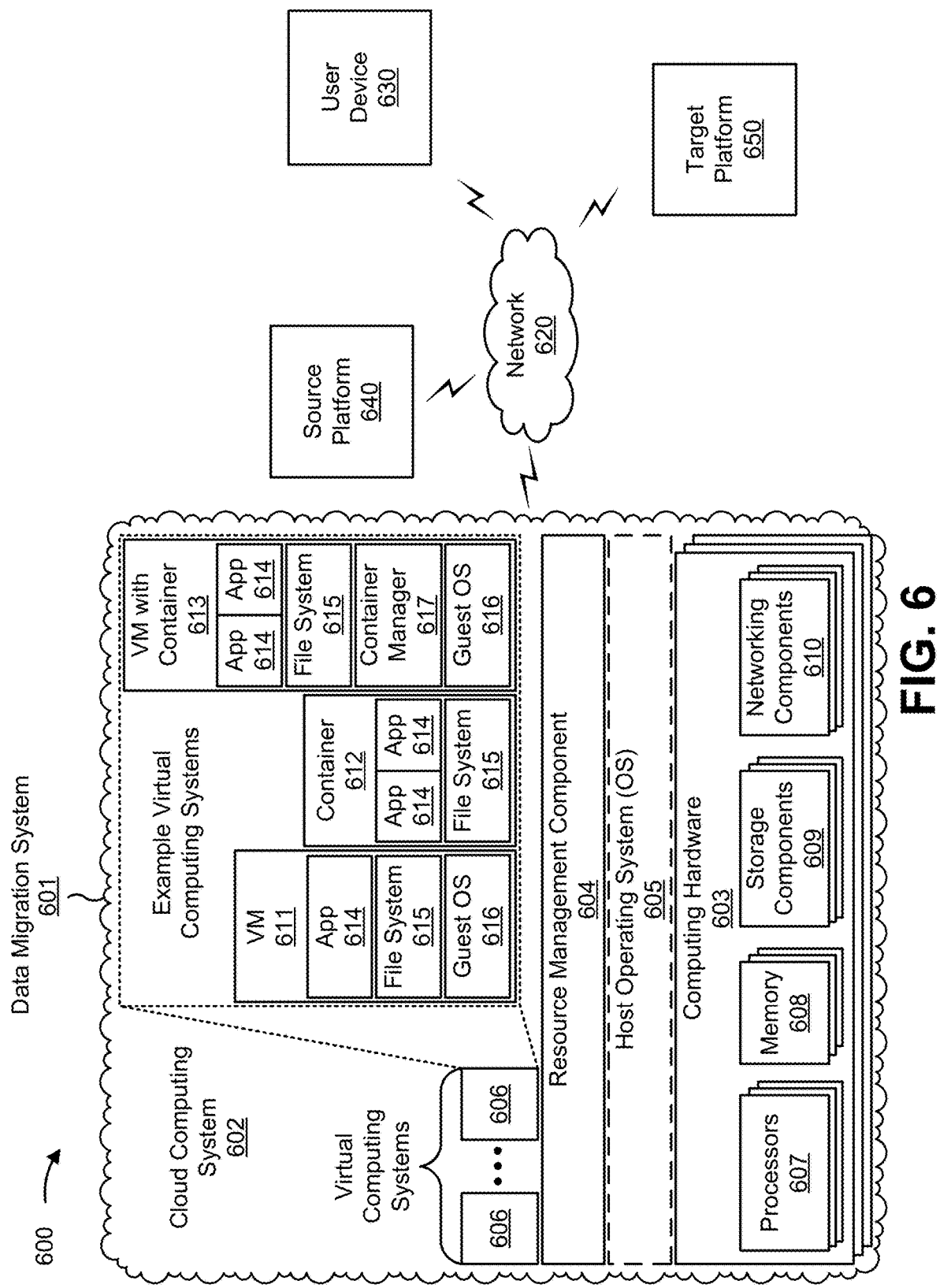
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include a data migration system 601. The data migration system 601 may include one or more elements of a cloud computing system 602 and/or may execute within the cloud computing system 602 (e.g., as one or more virtual computing systems 606). The cloud computing system 602 may include one or more elements 603-617, as described in more detail below. As further shown in FIG. 6, environment 600 may include a network 620, a user device 630, a source platform 640, and/or a target platform 650. Devices of environment 600 may interconnect via wired connections, wireless connections, or a combination of wired and wireless connections.

The cloud computing system 602 includes computing hardware 603, a resource management component 604, a host operating system (OS) 605, and/or one or more virtual computing systems 606. The resource management component 604 may perform virtualization (e.g., abstraction) of computing hardware 603 to create the one or more virtual computing systems 606. Using such virtualization, the resource management component 604 enables a single computing device (e.g., a computer, a server, a host device, and/or the like) to operate as if the single computing device were multiple computing devices, such as by creating multiple isolated virtual computing systems 606 from computing hardware 603 of the single computing device. The multiple virtual computing systems 606 operate independently from one another and do not interact with one another. In this way, computing hardware 603 can operate more efficiently, with lower power consumption, higher reliability, higher availability, higher utilization, greater flexibility, and lower cost than using separate computing devices.

Computing hardware 603 includes hardware and corresponding resources from one or more computing devices. For example, computing hardware 603 may include hardware from a single computing device (e.g., a single server or host device) or from multiple computing devices (e.g., multiple servers or host devices), such as multiple computing devices in one or more data centers, server farms, server pools, and/or the like. As shown, computing hardware 603 may include one or more processors 607, one or more memories 608, one or more storage components 609, and/or one or more networking components 610. Computing hardware 603 may be interconnected via one or more wired and/or wireless buses, which may interconnect computing hardware 603 within a single computing device and/or across multiple computing devices.

A processor 607 includes a central processing unit, a graphics processing unit, and/or the like. A memory 608 includes random access memory, read-only memory, and/or the like. The memory 608 may store a set of instructions (e.g., one or more instructions) for execution by the processor 607. The processor 607 may execute the set of instructions to perform one or more operations or processes described herein. In some implementations, execution of the set of instructions, by one or more processors 607, causes the one or more processors 607 and/or the data migration system 601 to perform one or more operations or processes described herein. A storage component 609 includes a hard disk or another type of storage device that stores information, data, and/or software (e.g., code, instructions, and/or the like) related to the operation and use of the data migration system 601. In some implementations, memory 608 and/or storage component 609 is/are implemented as a non-transitory computer readable medium. A networking component 610 includes a network interface and corresponding hardware that enables the data migration system 601 to communicate with other devices of environment 600 via a wired connection and/or a wireless connection, such as via network 620. Additional examples of a processor, a memory, a storage component, and a networking component (e.g., a communication interface) are described elsewhere herein.

The resource management component 604 includes a virtualization application (e.g., executing on hardware, such as computing hardware 603) capable of virtualizing computing hardware 603 to start (e.g., create or spin up), stop (e.g., delete or tear down), and/or manage one or more virtual computing systems 606. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 604 may control access to and/or use of computing hardware 603 and/or software executing on computing hardware 603. Additionally, or alternatively, the resource management component 604 may perform binary rewriting to scan instructions received from a virtual computing system 606 and replace any privileged instructions with safe emulations of those instructions. The resource management component 604 may include a hypervisor or a virtual machine monitor, such as when the virtual computing systems 606 are virtual machines 611. Additionally, or alternatively, the resource management component 604 may include a container manager, such as when the virtual computing systems 606 are containers 612.

In some implementations, the resource management component 604 executes within and/or in coordination with a host operating system 605. For example, the resource management component 604 may execute on top of the host operating system 605 rather than interacting directly with computing hardware 603, such as when the resource management component 604 is a hosted hypervisor (e.g., a Type 2 hypervisor) or a container manager. In this case, the host operating system 605 may control access to and/or use of computing hardware 603 and/or software executing on computing hardware 603 based on information and/or instructions received from the resource management component 604. Alternatively, the resource management component 604 may interact directly with computing hardware 603 rather than interacting with the host operating system 605, such as when the resource management component 604 is a bare-metal hypervisor (e.g., a Type 1 hypervisor). Thus, in some implementations, the cloud computing system 602 does not include a host operating system 605. In some implementations, the host operating system 605 includes and/or executes an administrator application to enable a system administrator to manage, customize, and/or configure cloud computing system 602.

A virtual computing system 606 includes a virtual environment that enables cloud-based execution of operations and/or processes described herein using computing hardware 603. As shown, a virtual computing system 606 may include a virtual machine 611, a container 612, a hybrid environment 613 that includes a virtual machine and a container, and/or the like. A virtual computing system 606 may execute one or more applications 614 using a file system 615. The file system 615 may include binary files, software libraries, and/or other resources required to execute applications 614 on a guest operating system 616 or the host operating system 605. In some implementations, a virtual computing system 606 (e.g., a virtual machine 611 or a hybrid environment 613) includes a guest operating system 616. In some implementations, a virtual computing system 606 (e.g., a container 612 or a hybrid environment 613) includes a container manager 617.

A virtual machine 611 is an emulation of a computing device that enables execution of separate, isolated instances of virtual computing devices (e.g., multiple virtual machines 611) on the same computing hardware 603. The guest operating systems 616 and applications 614 of multiple virtual machines 611 may share computing hardware 603 from a single computing device or from multiple computing devices (e.g., a pool of computing devices). Each separate virtual machine 611 may include a guest operating system 616, a file system 615, and one or more applications 614. With a virtual machine 611, the underlying computing hardware 603 is virtualized, and the guest operating system 616 executes on top of this virtualized hardware. Using virtual machines 611 enables different types of guest operating systems 616 to execute on the same computing hardware 603 in an isolated environment, but with more resource usage and overhead than containers 612.

Unlike a virtual machine 611, a container 612 virtualizes a host operating system 605 rather than the underlying computing hardware 603. Thus, a container 612 does not require a guest operating system 616 because the application (s) 614 included in the container 612 execute directly on the host operating system 605 using a file system 615 included in the container 612. Each separate container 612 may share the kernel of the host operating system 605, and different applications 614 within a single container 612 may share a file system 615. This sharing of a file system 615 among multiple applications 614 reduces the need to reproduce operating system code for different applications, and enables a single host operating system 605 to execute multiple applications 614 and/or containers 612. As a result, containers 612 enable a greater quantity of applications 614 to execute on a smaller quantity of computing devices as compared to virtual machines 611.

A hybrid environment 613 includes elements of a virtual machine 611 and a container 612. For example, a hybrid environment 613 may include a guest operating system 616 that executes on top of virtualized hardware. A container manager 617 may execute on top of the guest operating system 616 to start, stop, and/or manage one or more containers within the hybrid environment 613. Using a hybrid environment 613 enables different types of guest operating systems 616 to execute on the same computing hardware 603 in an isolated environment, while also enabling lightweight containers to execute on top of the guest operating system 616.

The quantity of applications 614 shown in FIG. 6 as executing within each virtual computing system 606 is shown as an example, and a different quantity of applications 614 may execute within each virtual computing system. Furthermore, although the data migration system 601 may include one or more elements 603-617 of the cloud computing system 602, may execute within the cloud computing system 602, and/or may be hosted within the cloud computing system 603, in some implementations, the data migration system 601 may not be cloud-based (e.g., may be implemented outside of a cloud computing system) or may be partially cloud-based. For example, the data migration system 601 may include one or more devices that are not part of the cloud computing system 602, such as device 700 of FIG. 7, which may include a standalone server or another type of computing device. The data migration system 601 may perform one or more operations and/or processes described in more detail elsewhere herein.

Network 620 includes one or more wired and/or wireless networks. For example, network 620 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 620 enables communication among the devices of environment 600.

The user device 630 includes one or more devices capable of receiving, generating, storing, processing, and/or providing information, such as information described herein. For example, user device 630 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, user device 630 may receive information from and/or transmit information to data migration system 601.

The source platform 640 includes one or more devices capable of receiving, generating, storing, processing, and/or providing information, such as information described herein. For example, source platform 640 hosted by a cloud computing environment or by one or more server devices. In some implementations, source platform 640 may receive information from and/or transmit information to data migration system 601.

The target platform 650 includes one or more devices capable of receiving, generating, storing, processing, and/or providing information, such as information described herein. For example, target platform 650 hosted by a cloud computing environment or by one or more server devices. In some implementations, target platform 650 may receive information from and/or transmit information to data migration system 601.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
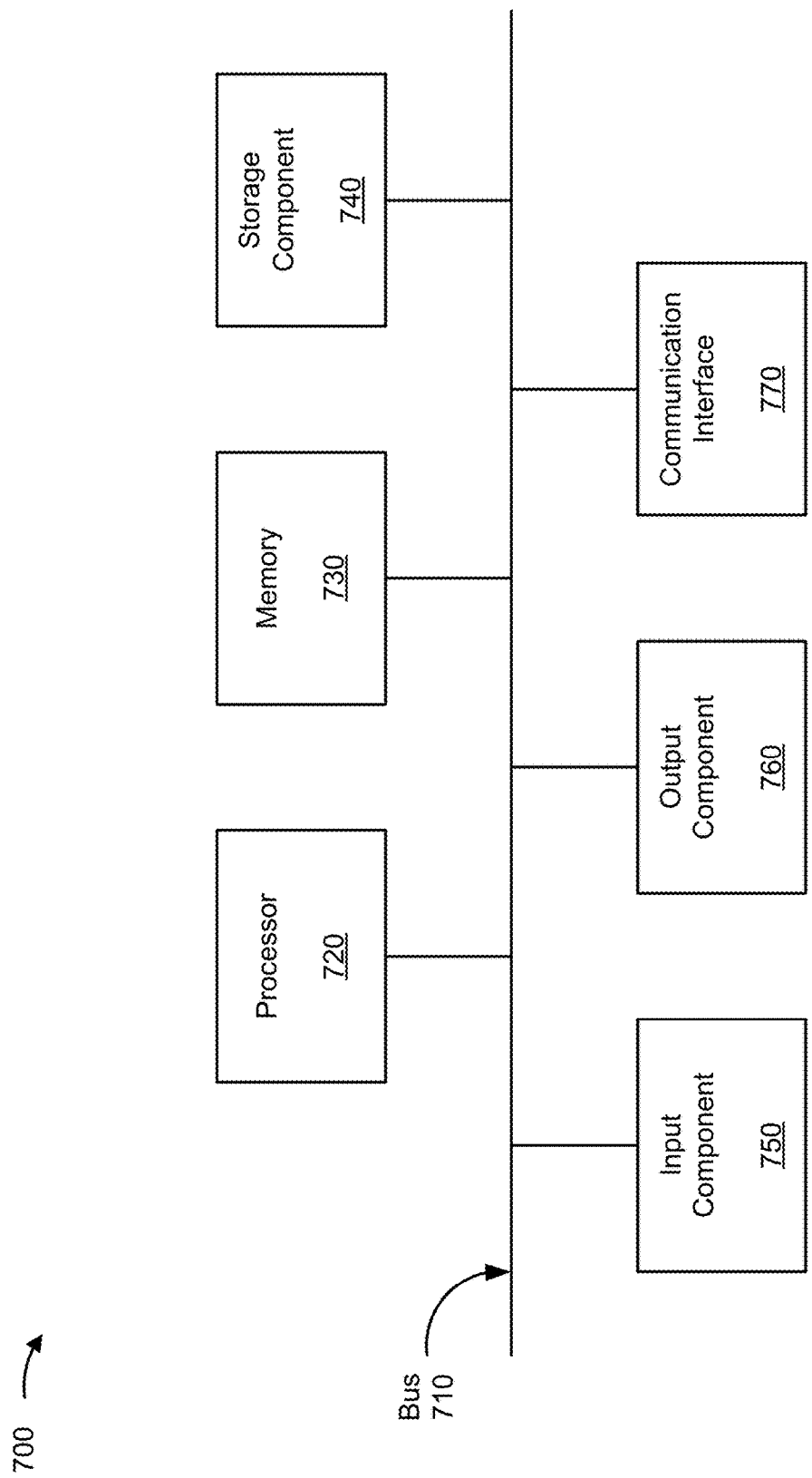
FIG. 7 is a diagram of example components of one or more devices of FIG. 6.

FIG. 7 is a diagram of example components of a device 700. Device 700 may correspond to data migration system 601, user device 630, source platform 640, and/or target platform 650. In some implementations, data migration system 601, user device 630, source platform 640, and/or target platform 650 may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random-access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

Device 700 may perform one or more processes described herein. Device 700 may perform these processes based on processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 5. Additionally, or alternatively, a set of components (e.g., one or more components) of device 700 may perform one or more functions described as being performed by another set of components of device 700.

Figure 8:
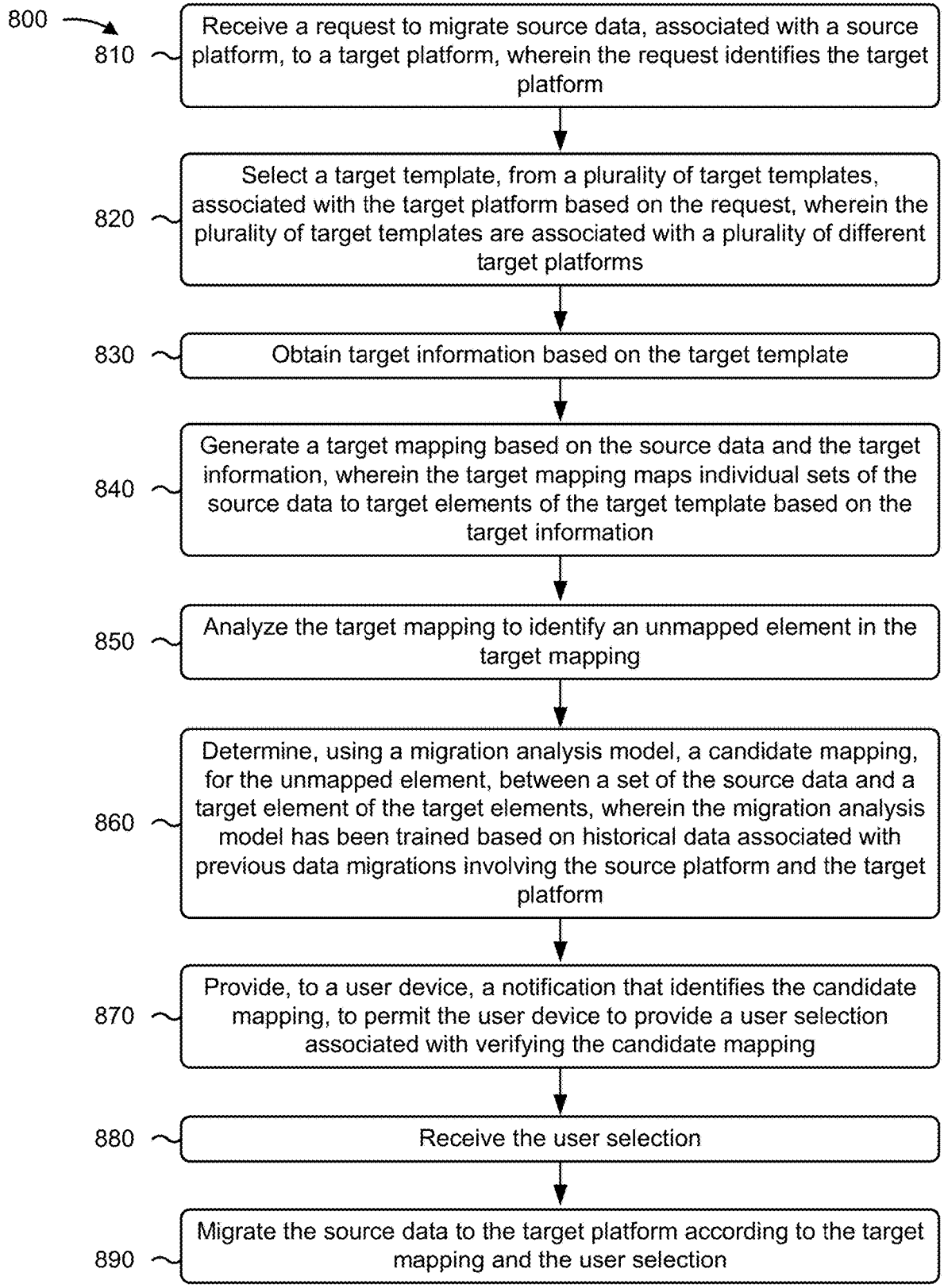
FIGS. 8-10 are flow charts of example processes for migrating data from a source platform to a target platform.

FIG. 8 is a flow chart of an example process 800 associated with migrating data from a source platform to a target platform. In some implementations, one or more process blocks of FIG. 8 may be performed by a device (e.g., data migration system 601). In some implementations, one or more process blocks of FIG. 8 may be performed by another device or a group of devices separate from or including the device, such as a user device (e.g., user device 630), a source platform (e.g., source platform 640), a target platform (e.g., target platform 650), and/or the like.

As shown in FIG. 8, process 800 may include receiving a request to migrate source data, associated with a source platform, to a target platform, wherein the request identifies the target platform (block 810). For example, the device (e.g., using processor 720, memory 730, storage component 740, input component 750, output component 760, communication interface 770, and/or the like) may receive a request to migrate source data, associated with a source platform, to a target platform, as described above. In some implementations, the request identifies the target platform.

As further shown in FIG. 8, process 800 may include selecting a target template, from a plurality of target templates, associated with the target platform based on the request, wherein the plurality of target templates are associated with a plurality of different target platforms (block 820). For example, the device (e.g., using processor 720, memory 730, storage component 740, input component 750, output component 760, communication interface 770, and/or the like) may select a target template, from a plurality of target templates, associated with the target platform based on the request, as described above. In some implementations, the plurality of target templates are associated with a plurality of different target platforms.

As further shown in FIG. 8, process 800 may include obtaining target information based on the target template (block 830). For example, the device (e.g., using processor 720, memory 730, storage component 740, input component 750, output component 760, communication interface 770, and/or the like) may obtain target information based on the target template, as described above.

As further shown in FIG. 8, process 800 may include generating a target mapping based on the source data and the target information, wherein the target mapping maps individual sets of the source data to target elements of the target template based on the target information (block 840). For example, the device (e.g., using processor 720, memory 730, storage component 740, input component 750, output component 760, communication interface 770, and/or the like) may generate a target mapping based on the source data and the target information, as described above. In some implementations, the target mapping maps individual sets of the source data to target elements of the target template based on the target information.

As further shown in FIG. 8, process 800 may include analyzing the target mapping to identify an unmapped element in the target mapping (block 850). For example, the device (e.g., using processor 720, memory 730, storage component 740, input component 750, output component 760, communication interface 770, and/or the like) may analyze the target mapping to identify an unmapped element in the target mapping, as described above.

As further shown in FIG. 8, process 800 may include determining, using a migration analysis model, a candidate mapping, for the unmapped element, between a set of the source data and a target element of the target elements, wherein the migration analysis model has been trained based on historical data associated with previous data migrations involving the source platform and the target platform (block 860). For example, the device (e.g., using processor 720, memory 730, storage component 740, input component 750, output component 760, communication interface 770, and/or the like) may determine, using a migration analysis model, a candidate mapping, for the unmapped element, between a set of the source data and a target element of the target elements, as described above. In some implementations, the migration analysis model has been trained based on historical data associated with previous data migrations involving the source platform and the target platform.

As further shown in FIG. 8, process 800 may include providing, to a user device, a notification that identifies the candidate mapping, to permit the user device to provide a user selection associated with verifying the candidate mapping (block 870). For example, the device (e.g., using processor 720, memory 730, storage component 740, input component 750, output component 760, communication interface 770, and/or the like) may provide, to a user device, a notification that identifies the candidate mapping, to permit the user device to provide a user selection associated with verifying the candidate mapping, as described above.

As further shown in FIG. 8, process 800 may include receiving the user selection (block 880). For example, the device (e.g., using processor 720, memory 730, storage component 740, input component 750, output component 760, communication interface 770, and/or the like) may receive the user selection, as described above.

As further shown in FIG. 8, process 800 may include migrating the source data to the target platform according to the target mapping and the user selection (block 890). For example, the device (e.g., using processor 720, memory 730, storage component 740, input component 750, output component 760, communication interface 770, and/or the like) may migrate the source data to the target platform according to the target mapping and the user selection, as described above.

Process 800 may include additional implementations, such as any single implementation or any combination of implementations described below and/or in connection with one or more other processes described elsewhere herein.

In some implementations, the target template includes a set of templates that are associated with at least one of: an assembly (or a group) of a plurality of objects of the target platform, an object of the target platform, a configuration of the object of the target platform, an attribute of the object of the target platform, metadata of the object of the target platform, or a rule associated with the object of the target platform.

In some implementations, the unmapped element is associated with a set of the source data.

In some implementations, the migration analysis model is configured to select the candidate mapping based on source metadata associated with the set of the source data and target metadata associated with the target element, the source metadata is identified as being associated with the target metadata in a data structure associated with the migration analysis model.

In some implementations, the unmapped element is a first unmapped element and the candidate mapping is a first candidate mapping, the migration analysis model comprises a machine learning model that is trained according to the user selection. Process 800 may include identifying that a second unmapped element in the target mapping is associated with the first unmapped element, and determining, using the machine learning model, a second candidate mapping, for the second unmapped element, that is based on the user selection; and mapping a set of the source data to one of the target elements according to the second candidate mapping. For example, the first unmapped element may be an object and the second unmapped element may be a field of the object. Alternatively, the first unmapped element may be a field of an object and the second unmapped element may be another field of the object.

In some implementations, the unmapped element corresponds to an unmapped target element that is associated with a plurality of parameters. Process 800 may include determining the candidate mapping comprises: identifying target metadata associated with the plurality of parameters; analyzing the source data to identify source metadata that is associated with the target metadata, and determining that the set of the source data is associated with the target element based on the source metadata being associated with the target metadata.

In some implementations, process 800 may include migrating the source data to the target platform comprises: integrating the source data with one or more application programming interfaces (APIs) of the target platform according to an API template of the target template.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
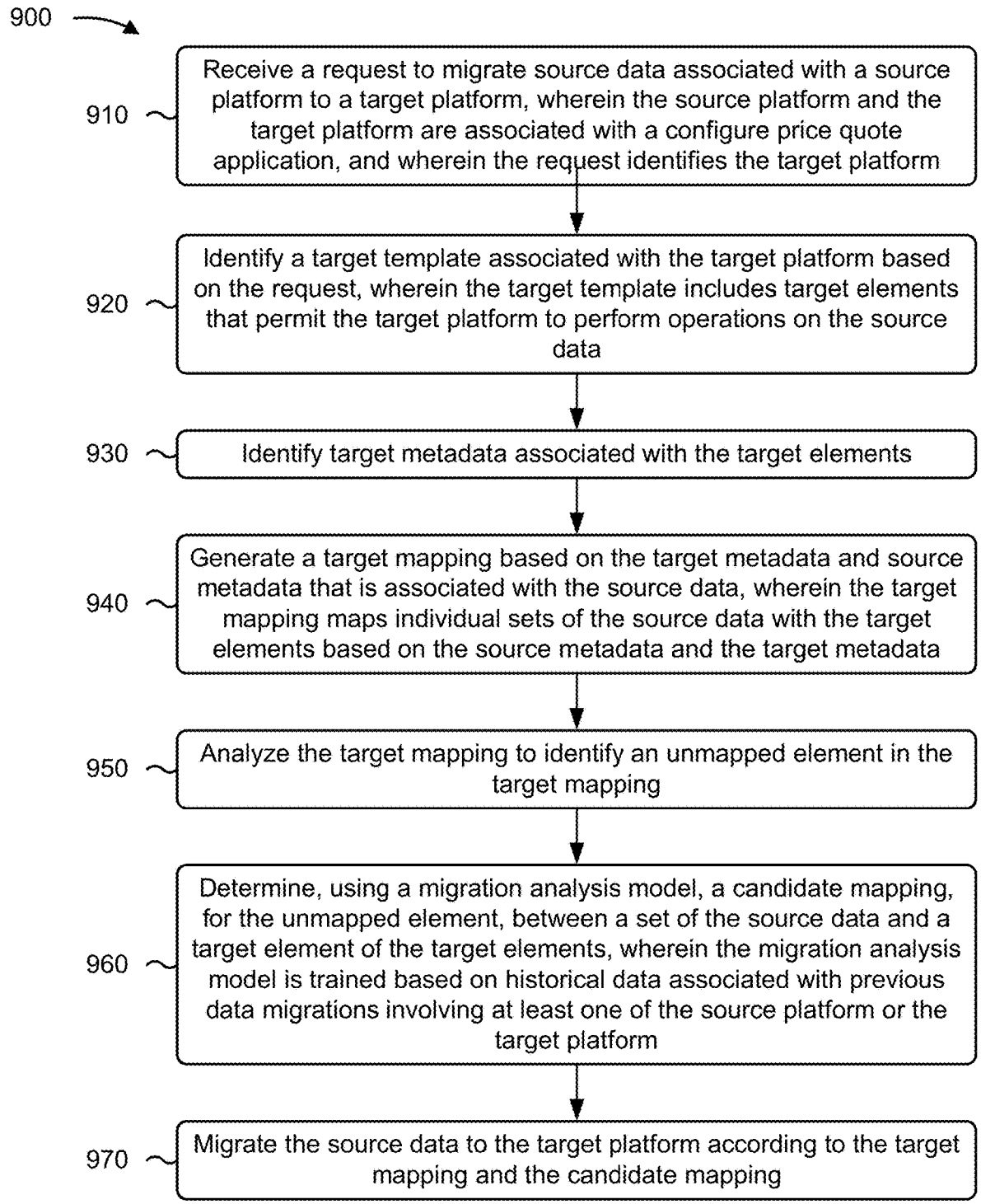

FIG. 9 is a flow chart of an example process 900 associated with migrating data from a source platform to a target platform. In some implementations, one or more process blocks of FIG. 9 may be performed by a device (e.g., data migration system 601). In some implementations, one or more process blocks of FIG. 9 may be performed by another device or a group of devices separate from or including the device, such as a user device (e.g., user device 630), a source platform (e.g., source platform 640), a target platform (e.g., target platform 650), and/or the like.

As shown in FIG. 9, process 900 may include receiving a request to migrate source data associated with a source platform to a target platform, wherein the request identifies the target platform (block 910). For example, the device (e.g., using processor 720, memory 730, storage component 740, input component 750, output component 760, communication interface 770, and/or the like) may receive a request to migrate source data associated with a source platform to a target platform, as described above. In some implementations, the source platform and the target platform are associated with a configure price quote application and the request identifies the target platform.

As further shown in FIG. 9, process 900 may include identifying a target template associated with the target platform based on the request, wherein the target template includes target elements that permit the target platform to perform operations on the source data (block 920). For example, the device (e.g., using processor 720, memory 730, storage component 740, input component 750, output component 760, communication interface 770, and/or the like) may identify a target template associated with the target platform based on the request, as described above. In some implementations, the target template includes target elements that permit the target platform to perform operations on the source data.

As further shown in FIG. 9, process 900 may include identifying target metadata associated with the target elements (block 930). For example, the device (e.g., using processor 720, memory 730, storage component 740, input component 750, output component 760, communication interface 770, and/or the like) may identify target metadata associated with the target elements, as described above.

As further shown in FIG. 9, process 900 may include generating a target mapping based on the target metadata and source metadata that is associated with the source data, wherein the target mapping maps individual sets of the source data with the target elements based on the source metadata and the target metadata (block 940). For example, the device (e.g., using processor 720, memory 730, storage component 740, input component 750, output component 760, communication interface 770, and/or the like) may generate a target mapping based on the target metadata and source metadata that is associated with the source data, as described above. In some implementations, the target mapping maps individual sets of the source data with the target elements based on the source metadata and the target metadata.

As further shown in FIG. 9, process 900 may include analyzing the target mapping to identify an unmapped element in the target mapping (block 950). For example, the device (e.g., using processor 720, memory 730, storage component 740, input component 750, output component 760, communication interface 770, and/or the like) may analyze the target mapping to identify an unmapped element in the target mapping, as described above.

As further shown in FIG. 9, process 900 may include determining, using a migration analysis model, a candidate mapping, for the unmapped element, between a set of the source data and a target element of the target elements, wherein the migration analysis model is trained based on historical data associated with previous data migrations involving at least one of the source platform or the target platform (block 960). For example, the device (e.g., using processor 720, memory 730, storage component 740, input component 750, output component 760, communication interface 770, and/or the like) may determine, using a migration analysis model, a candidate mapping, for the unmapped element, between a set of the source data and a target element of the target elements, as described above. In some implementations, the migration analysis model is trained based on historical data associated with previous data migrations involving at least one of the source platform or the target platform.

As further shown in FIG. 9, process 900 may include migrating the source data to the target platform according to the target mapping and the candidate mapping (block 970). For example, the device (e.g., using processor 720, memory 730, storage component 740, input component 750, output component 760, communication interface 770, and/or the like) may migrate the source data to the target platform according to the target mapping and the candidate mapping, as described above.

Process 900 may include additional implementations, such as any single implementation or any combination of implementations described below and/or in connection with one or more other processes described elsewhere herein.

In some implementations, the unmapped element is one of the target elements of the target template.

In some implementations, the migration analysis model is configured to determine the candidate mapping based on the historical data indicating that previous source metadata associated with the set of the source data was previously mapped to previous target metadata associated with the target element.

In some implementations, the candidate mapping is determined based on a user input that selects the set of the source data for the target element.

In some implementations, metadata of the source metadata and target metadata include at least one of: identifiers of the source data or target elements, types of the source data or target elements, or classifications associated with the source data or target elements.

In some implementations, process 900 may include requesting user authorization of the candidate mapping; and determining the candidate mapping based on receiving the user authorization.

In some implementations, the unmapped element is a first unmapped element and the candidate mapping is a first candidate mapping, the migration analysis model includes a supervised machine learning model that is trained according to the user authorization. Process 900 may include identifying that a second unmapped element in the target mapping is associated with the first unmapped element; determining, using the machine learning model, a second candidate mapping, for the second unmapped element, that is based on the user authorization, and mapping a set of the source data to one of the target elements according to the second candidate mapping.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
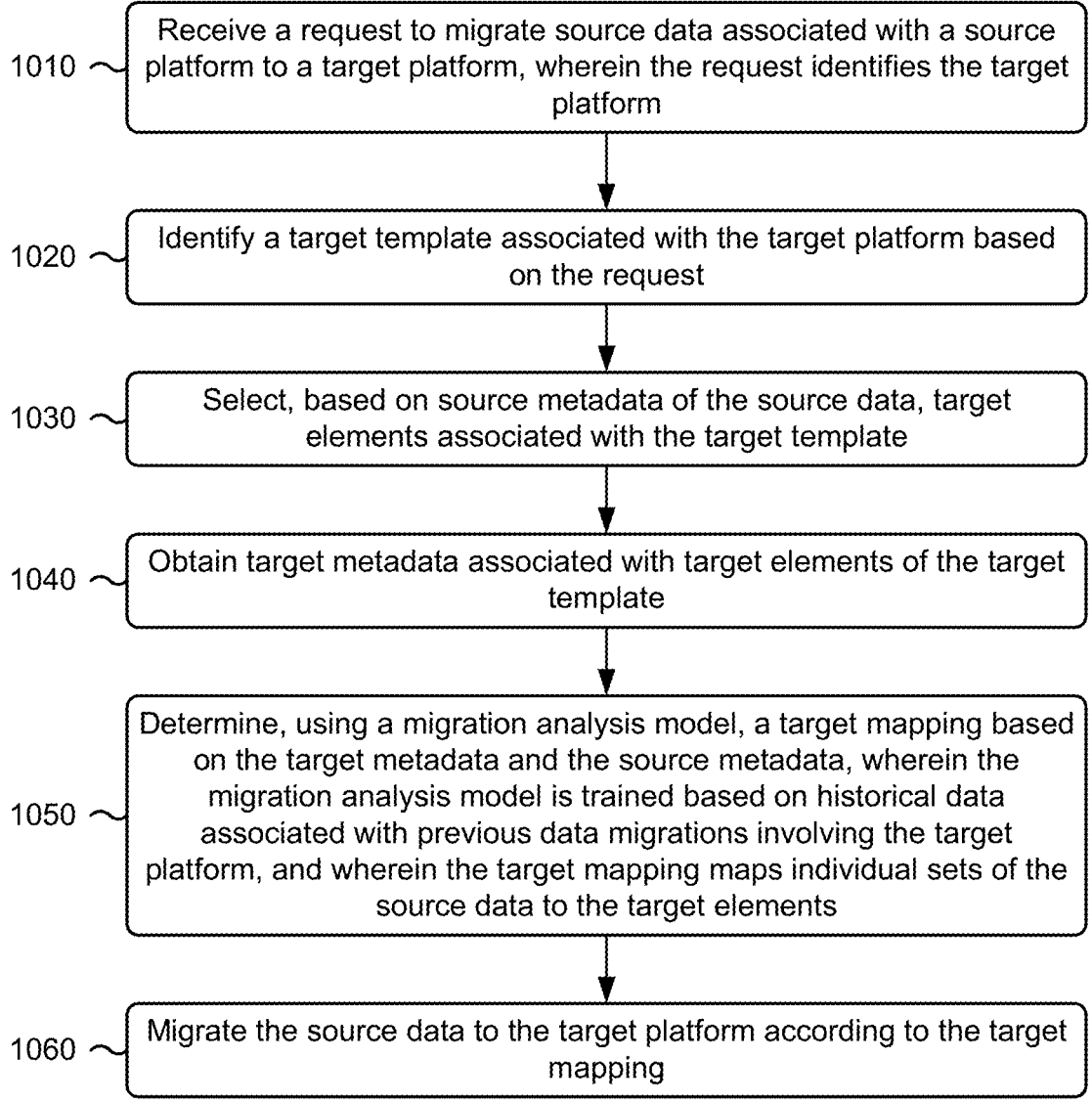

FIG. 10 is a flow chart of an example process 1000 associated with migrating data from a source platform to a target platform. In some implementations, one or more process blocks of FIG. 10 may be performed by a device (e.g., data migration system 601). In some implementations, one or more process blocks of FIG. 10 may be performed by another device or a group of devices separate from or including the device, such as a user device (e.g., user device 630), a source platform (e.g., source platform 640), a target platform (e.g., target platform 650), and/or the like.

As shown in FIG. 10, process 1000 may include receiving a request to migrate source data associated with a source platform to a target platform, wherein the request identifies the target platform (block 1010). For example, the device (e.g., using processor 720, memory 730, storage component 740, input component 750, output component 760, communication interface 770, and/or the like) may receive a request to migrate source data associated with a source platform to a target platform, as described above. In some implementations, the request identifies the target platform.

As further shown in FIG. 10, process 1000 may include identifying a target template associated with the target platform based on the request (block 1020). For example, the device (e.g., using processor 720, memory 730, storage component 740, input component 750, output component 760, communication interface 770, and/or the like) may identify a target template associated with the target platform based on the request, as described above.

As further shown in FIG. 10, process 1000 may include selecting, based on source metadata of the source data, target elements associated with the target template (block 1030). For example, the device (e.g., using processor 720, memory 730, storage component 740, input component 750, output component 760, communication interface 770, and/or the like) may select, based on source metadata of the source data, target elements associated with the target template, as described above.

As further shown in FIG. 10, process 1000 may include obtaining target metadata associated with target elements of the target template (block 1040). For example, the device (e.g., using processor 720, memory 730, storage component 740, input component 750, output component 760, communication interface 770, and/or the like) may obtain target metadata associated with target elements of the target template, as described above.

As further shown in FIG. 10, process 1000 may include determining, using a migration analysis model, a target mapping based on the target metadata and the source metadata, wherein the migration analysis model is trained based on historical data associated with previous data migrations involving the target platform, and wherein the target mapping maps individual sets of the source data to the target elements (block 1050). For example, the device (e.g., using processor 720, memory 730, storage component 740, input component 750, output component 760, communication interface 770, and/or the like) may determine, using a migration analysis model, a target mapping based on the target metadata and the source metadata, as described above. In some implementations, the migration analysis model is trained based on historical data associated with previous data migrations involving the target platform. In some implementations, the target mapping maps individual sets of the source data to the target elements.

As further shown in FIG. 10, process 1000 may include migrating the source data to the target platform according to the target mapping (block 1060). For example, the device (e.g., using processor 720, memory 730, storage component 740, input component 750, output component 760, communication interface 770, and/or the like) may migrate the source data to the target platform according to the target mapping, as described above.

Process 1000 may include additional implementations, such as any single implementation or any combination of implementations described below and/or in connection with one or more other processes described elsewhere herein.

In some implementations, process 1000 may include determining, based on a metadata database associated with the source platform and the target platform, a first target mapping that maps a first set of the individual sets of the source data to a first set of the target elements; identifying a second set of the individual sets of the source data that is not mapped, in the first target mapping, to any target element; request, via a user device, a user selection of a target element for the second set; determining a second target mapping for the second set to the target element based on the user selection from the user device; and generating the target mapping to include the first target mapping and the second target mapping.

In some implementations, process 1000 may include determining, based on a metadata database associated with the source platform and the target platform, a first target mapping that maps a first set of the individual sets of the source data to a first set of the target elements; identifying a second set of the individual sets of the source data that is not mapped, in the first target mapping, to any target element; determining a second target mapping for the second set to a target element based on at least one of a user input or a machine learning model of the migration analysis model; and generating the target mapping to include the first target mapping and the second target mapping.

In some implementations, process 1000 may include copying the individual sets of the source data into corresponding fields of the target elements; and enabling the target platform to perform one or more operations on the individual sets of the source data according to one or more executions of the target elements.

In some implementations, process 1000 may include integrating the source data with one or more application programming interfaces (APIs) of the target platform according to an API template of the target template.

In some implementations, the source platform and the target platform are associated with a configure price quote application.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a request to migrate source data, associated with a source platform, to a target platform, wherein the request identifies the target platform;
    selecting, by the device, a target template, from a plurality of target templates, associated with the target platform based on the request, wherein the plurality of target templates are associated with a plurality of different target platforms;
    obtaining, by the device, target information based on the target template;

generating, by the device, a target mapping based on the source data and the target information, wherein the target mapping maps individual sets of the source data to target elements of the target template based on the target information;

analyzing, by the device, the target mapping to identify an unmapped element in the target mapping;

determining, by the device and using a migration analysis model, a candidate mapping, for the unmapped element, between a set of the source data and a target element of the target elements,
  wherein the migration analysis model has been trained based on historical data associated with previous data migrations involving the source platform and the target platform;

providing, by the device and to a user device, a notification that identifies the candidate mapping, to permit the user device to provide a user selection associated with verifying the candidate mapping;

receiving, by the device, the user selection; and migrating, by the device, the source data to the target platform according to the target mapping and the user selection.

2. The method of claim 1, wherein the target template includes a set of templates that are associated with at least one of:
  an assembly of a plurality of objects of the target platform,
  an object of the target platform,
  a configuration of the object of the target platform,
  a parameter of the object of the target platform,
  metadata of the object of the target platform, or
  a rule associated with the object of the target platform.

3. The method of claim 1, wherein the unmapped element is associated with a set of the source data.

4. The method of claim 3, wherein the migration analysis model is configured to select the candidate mapping based on source metadata associated with the set of the source data and target metadata associated with the target element,
  wherein the source metadata is identified as being associated with the target metadata in a data structure associated with the migration analysis model.

5. The method of claim 1, wherein the unmapped element is a first unmapped element and the candidate mapping is a first candidate mapping,
  wherein the migration analysis model comprises a machine learning model that is trained according to the user selection, the method further comprising:
    identifying that a second unmapped element in the target mapping is associated with the first unmapped element;
    determining, using the machine learning model, a second candidate mapping, for the second unmapped element, that is based on the user selection; and
    mapping a set of the source data to one of the target elements according to the second candidate mapping.

6. The method of claim 1, wherein the unmapped element corresponds to an unmapped target element that is associated with a plurality of parameters,
  wherein determining the candidate mapping comprises:
    identifying target metadata associated with the plurality of parameters;
    analyzing the source data to identify source metadata that is associated with the target metadata; and
    determining that the set of the source data is associated with the target element based on the source metadata being associated with the target metadata.

7. The method of claim 1, wherein migrating the source data to the target platform comprises:
  integrating the source data with one or more application programming interfaces (APIs) of the target platform according to an API template of the target template.

8. A device, comprising:
one or more memories; and
one or more processors communicatively coupled to the one or more memories, configured to:
  receive a request to migrate source data associated with a source platform to a target platform,
    wherein the source platform and the target platform are associated with a price quote application, and
    wherein the request identifies the target platform;
  identify a target template associated with the target platform based on the request,
    wherein the target template includes target elements that permit the target platform to perform operations on the source data;
  identify target metadata associated with the target elements;
  generate a target mapping based on the target metadata and source metadata that is associated with the source data,
    wherein the target mapping maps individual sets of the source data with the target elements based on the source metadata and the target metadata;
  analyze the target mapping to identify an unmapped element in the target mapping;
  determine, using a migration analysis model, a candidate mapping, for the unmapped element, between a set of the source data and a target element of the target elements,
    wherein the migration analysis model is trained based on historical data associated with previous data migrations involving at least one of the source platform or the target platform; and
  migrate the source data to the target platform according to the target mapping and the candidate mapping.

9. The device of claim 8, wherein the unmapped element is one of the target elements of the target template.

10. The device of claim 8, wherein the migration analysis model is configured to determine the candidate mapping based on the historical data indicating that previous source metadata associated with the set of the source data was previously mapped to previous target metadata associated with the target element.

11. The device of claim 8, wherein the candidate mapping is determined based on a user input that selects the set of the source data for the target element.

12. The device of claim 8, wherein metadata of the source metadata and target metadata include at least one of:
  identifiers of the source data or target elements,
  types of the source data or target elements, or
  classifications associated with the source data or target elements.

13. The device of claim 8, wherein, prior to determining the candidate mapping, the one or more processors are configured to:
  request user authorization of the candidate mapping; and
  determine the candidate mapping based on receiving the user authorization.

14. The device of claim 13, wherein the unmapped element is a first unmapped element and the candidate mapping is a first candidate mapping, wherein the migration analysis model includes a supervised machine learning model that is trained according to the user authorization;
wherein the one or more processors, are further configured to:
identify that a second unmapped element in the target mapping is associated with the first unmapped element;
determine, using the machine learning model, a second candidate mapping, for the second unmapped element, that is based on the user authorization; and
map a set of the source data to one of the target elements according to the second candidate mapping.

15. A non-transitory computer-readable medium storing instructions, the instructions comprising:
one or more instructions that, when executed by one or more processors, cause the one or more processors to:
receive a request to migrate source data associated with a source platform to a target platform,
wherein the request identifies the target platform;
identify a target template associated with the target platform based on the request;
select, based on source metadata of the source data, target elements associated with the target template;
obtain target metadata associated with target elements of the target template;
determine, using a migration analysis model, a target mapping based on the target metadata and the source metadata,
wherein the migration analysis model is trained based on historical data associated with previous data migrations involving the target platform, and
wherein the target mapping maps individual sets of the source data to the target elements; and
migrate the source data to the target platform according to the target mapping.

16. The non-transitory computer-readable medium of claim 15, wherein the one or more instructions, that cause the one or more processors to determine the target mapping, cause the one or more processors to:
determine, based on a metadata database associated with the source platform and the target platform, a first target mapping that maps a first set of the individual sets of the source data to a first set of the target elements;
identify a second set of the individual sets of the source data that is not mapped, in the first target mapping, to any target element;
request, via a user device, a user selection of a target element for the second set;
determine a second target mapping for the second set to the target element based on the user selection from the user device; and
generate the target mapping to include the first target mapping and the second target mapping.

17. The non-transitory computer-readable medium of claim 15, wherein the one or more instructions, that cause the one or more processors to determine the target mapping, further cause the one or more processors to:
determine, based on a metadata database associated with the source platform and the target platform, a first target mapping that maps a first set of the individual sets of the source data to a first set of the target elements;
identify a second set of the individual sets of the source data that is not mapped, in the first target mapping, to any target element;
determine a second target mapping for the second set to a target element based on at least one of a user input or a machine learning model of the migration analysis model; and
generate the target mapping to include the first target mapping and the second target mapping.

18. The non-transitory computer-readable medium of claim 15, wherein the one or more instructions, that cause the one or more processors to migrate the source data to the target platform, cause the one or more processors to:
copy the individual sets of the source data into corresponding fields of the target elements; and
enable the target platform to perform one or more operations on the individual sets of the source data according to one or more executions of the target elements.

19. The non-transitory computer-readable medium of claim 15, wherein the one or more instructions, that cause the one or more processors to migrate the source data to the target platform, cause the one or more processors to:
integrate the source data with one or more application programming interfaces (APIs) of the target platform according to an API template of the target template.

20. The non-transitory computer-readable medium of claim 15, wherein the source platform and the target platform are associated with a price quote application.

* * * * *